United States Patent
Kim et al.

(10) Patent No.: US 12,082,110 B2
(45) Date of Patent: *Sep. 3, 2024

(54) SCHEDULING-POWER PROFILE FOR UE POWER SAVINGS

(71) Applicant: Apple Inc., Cupertino, CA (US)

(72) Inventors: Yuchul Kim, Santa Clara, CA (US); Wei Zhang, Santa Clara, CA (US); Sami M. Almalfouh, San Jose, CA (US); Junsung Lim, San Jose, CA (US); Haitong Sun, Irvine, CA (US); Wei Zeng, San Diego, CA (US); Dawei Zhang, Saratoga, CA (US); Zhu Ji, San Jose, CA (US); Yang Li, Plano, TX (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/083,968

(22) Filed: Dec. 19, 2022

(65) Prior Publication Data

US 2023/0118771 A1 Apr. 20, 2023

Related U.S. Application Data

(63) Continuation of application No. 16/295,230, filed on Mar. 7, 2019, now Pat. No. 11,589,305.

(Continued)

(51) Int. Cl.
*H04W 52/02* (2009.01)
*H04W 72/0446* (2023.01)
*H04W 72/23* (2023.01)

(52) U.S. Cl.
CPC ... *H04W 52/0216* (2013.01); *H04W 72/0446* (2013.01); *H04W 72/23* (2023.01)

(58) Field of Classification Search
CPC ......... H04W 52/0216; H04W 52/0229; H04W 72/042; H04W 72/0446
(Continued)

(56) References Cited

U.S. PATENT DOCUMENTS 9,265,013 B2 2/2016 Zee
9,467,944 B2 10/2016 Khay-Ibbat
(Continued)

FOREIGN PATENT DOCUMENTS

CN 101094017 12/2007
CN 104904150 9/2015
(Continued)

OTHER PUBLICATIONS

Notice of Grant for Patent Right for CN Patent Application No. 201910183822.0; 6 pages; dated Sep. 23, 2022.

*Primary Examiner* — Nizam U Ahmed
(74) *Attorney, Agent, or Firm* — Kowert, Hood, Munyon, Rankin & Goetzel, P.C.

(57) ABSTRACT

Apparatuses, systems, and methods for a wireless device to perform a method including a user equipment device (UE) exchanging communications with a base station to determine one or more scheduling profiles, such as one or more scheduling-power profiles, where a scheduling-power profile may specify one or more parameters associated with UE communication behavior, e.g., one or more constraints on UE communication behavior and/or slot scheduling of UE communications. In addition, the method may include the UE receiving a slot configuration schedule from the base station. The slot configuration schedule may be based on at least one scheduling-power profile of the one or more scheduling-power profiles. Further, the method may include the UE performing communications with the base station based on the at least one scheduling-power profile.

20 Claims, 19 Drawing Sheets

Related U.S. Application Data

(60) Provisional application No. 62/641,564, filed on Mar. 12, 2018.

(58) Field of Classification Search
USPC .......................................................... 370/311
See application file for complete search history.

(56) References Cited

U.S. PATENT DOCUMENTS

| | | | |
|---|---|---|---|
| 9,820,225 | B2 | 11/2017 | Ang |
| 2006/0094450 | A1* | 5/2006 | Park .................. H04W 52/0225 |
| | | | 455/458 |
| 2006/0270432 | A1 | 11/2006 | Dominique |
| 2008/0039128 | A1 | 2/2008 | Ostman |
| 2011/0018346 | A1 | 1/2011 | Dixon |
| 2012/0213139 | A1 | 8/2012 | Zee |
| 2013/0107727 | A1 | 5/2013 | Lunden |
| 2015/0085728 | A1 | 3/2015 | Majjigi |
| 2015/0319718 | A1 | 11/2015 | Yang |
| 2016/0127997 | A1 | 5/2016 | Ang |
| 2019/0124630 | A1 | 4/2019 | Ji |
| 2019/0150187 | A1 | 5/2019 | Park |
| 2019/0261405 | A1* | 8/2019 | Ang ..................... H04W 28/06 |
| 2019/0394009 | A1 | 12/2019 | Yoshimoto |

FOREIGN PATENT DOCUMENTS

| | | |
|---|---|---|
| CN | 107734624 | 2/2018 |
| EP | 3282776 | 2/2018 |
| WO | 2018031623 | 2/2018 |

\* cited by examiner

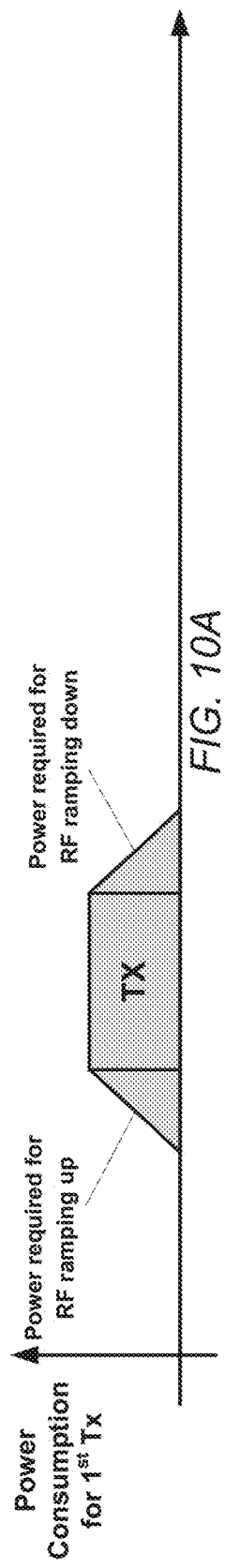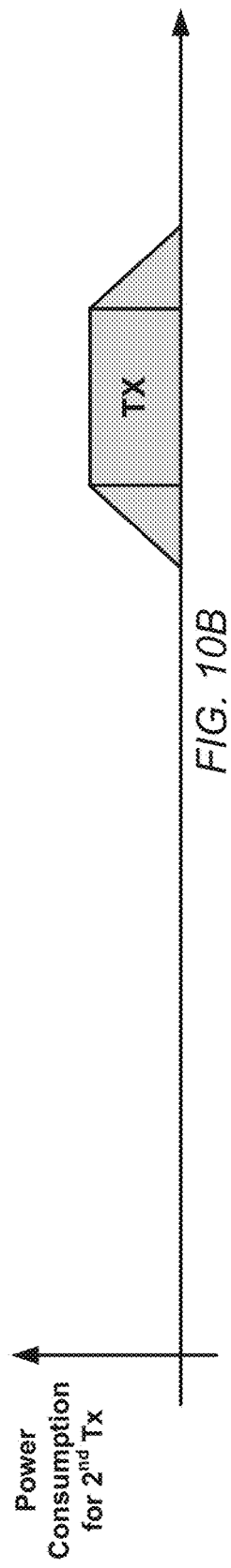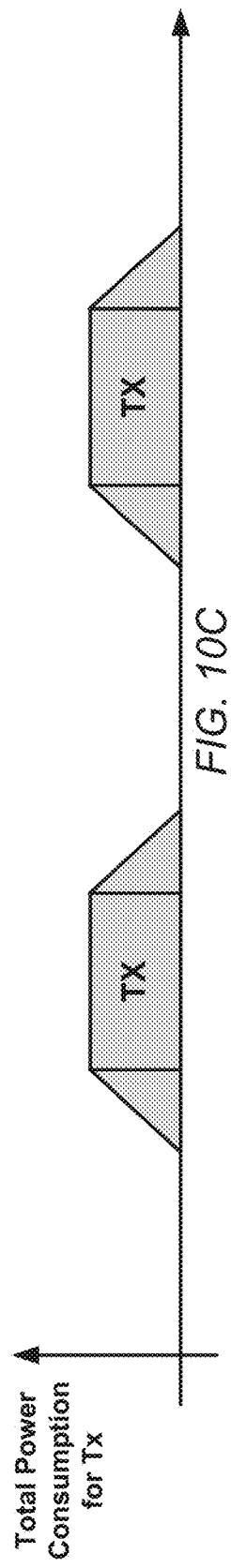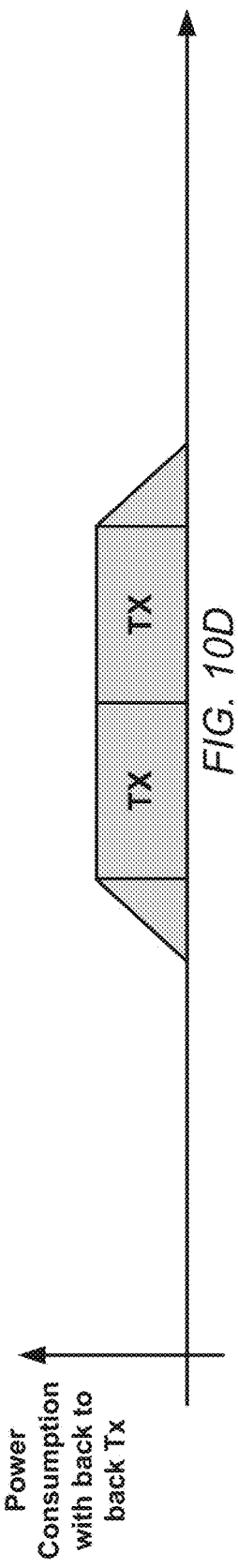
FIG. 10A (Prior Art)
FIG. 10B (Prior Art)
FIG. 10C (Prior Art)
FIG. 10D

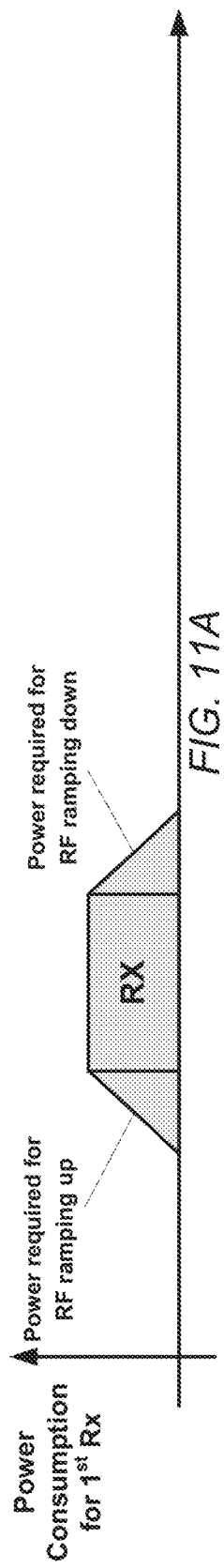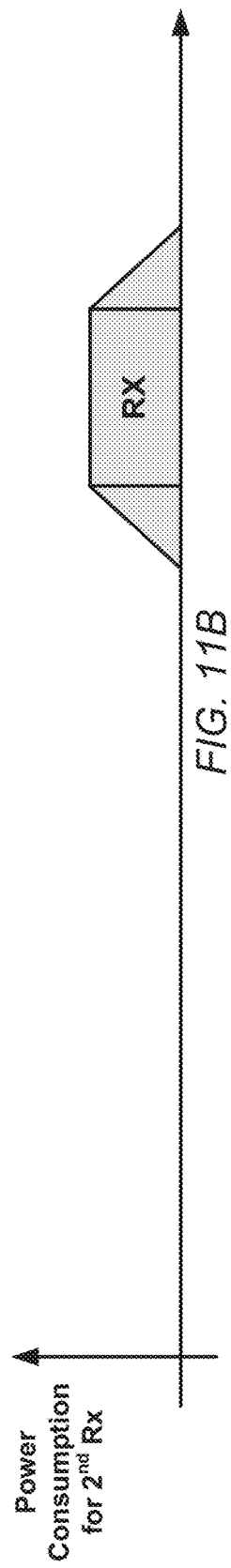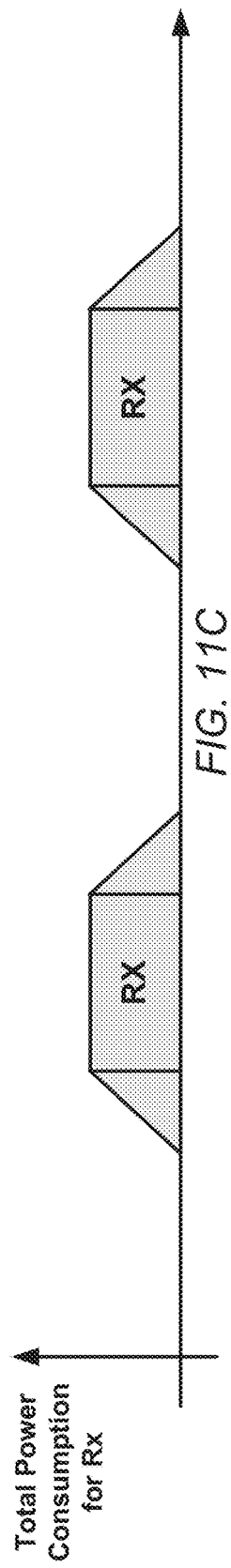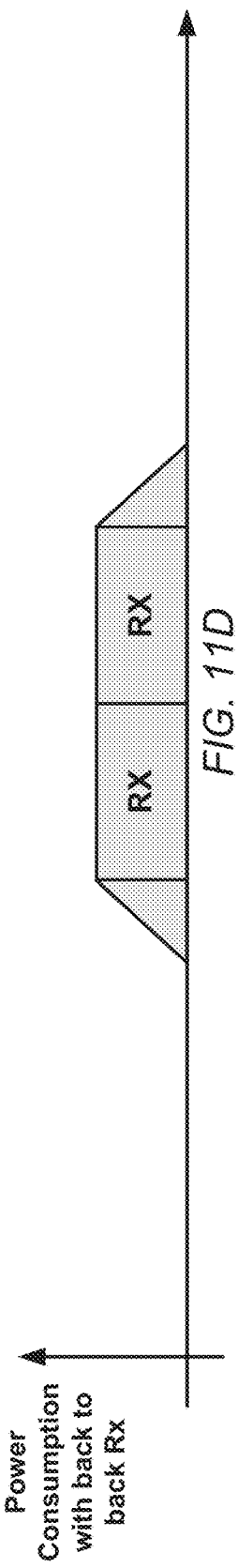

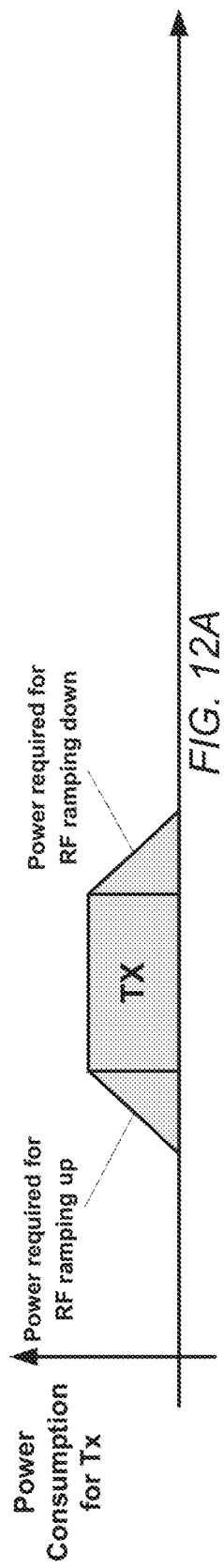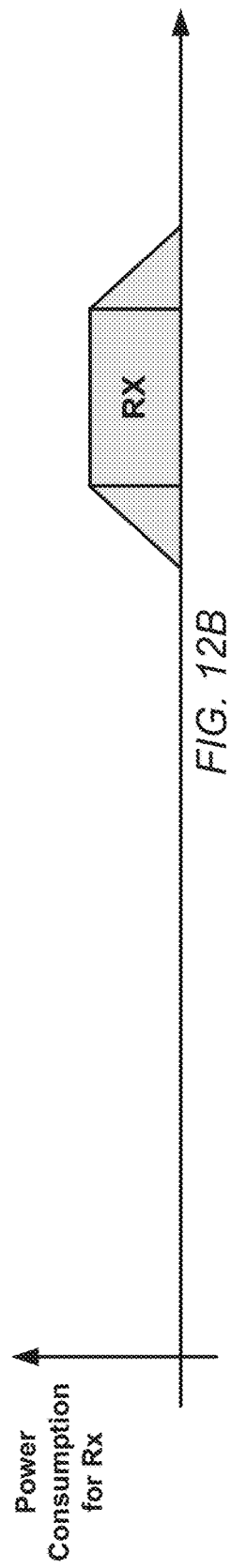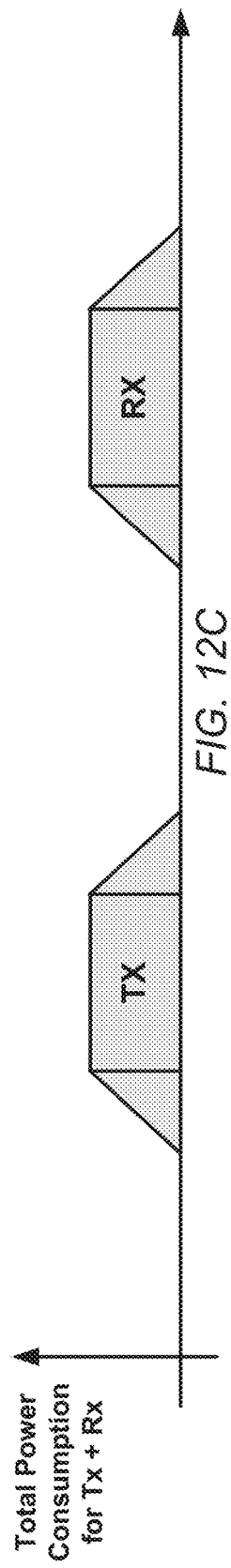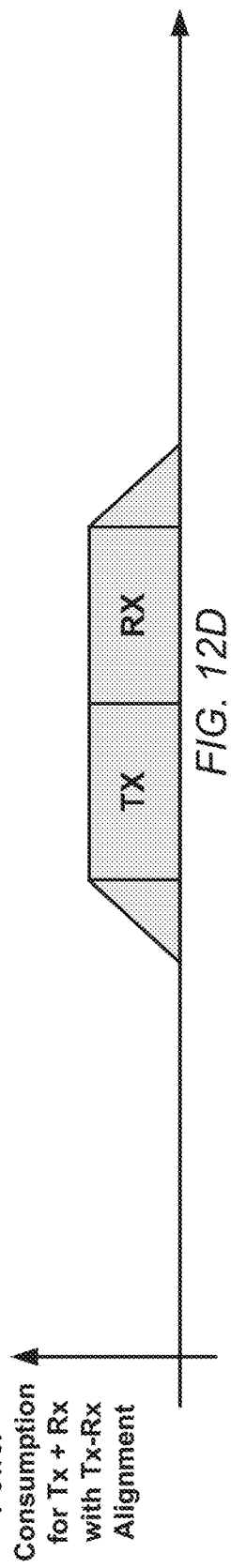

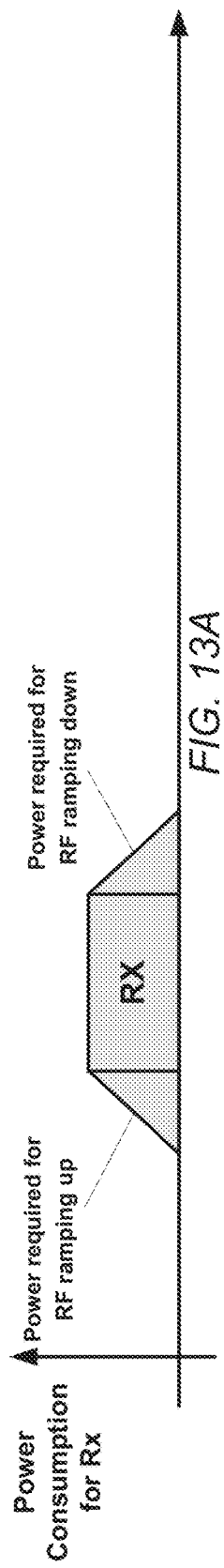
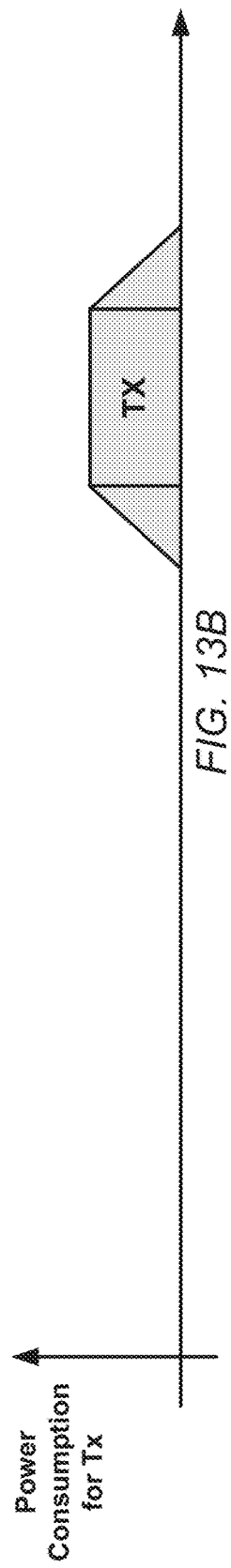
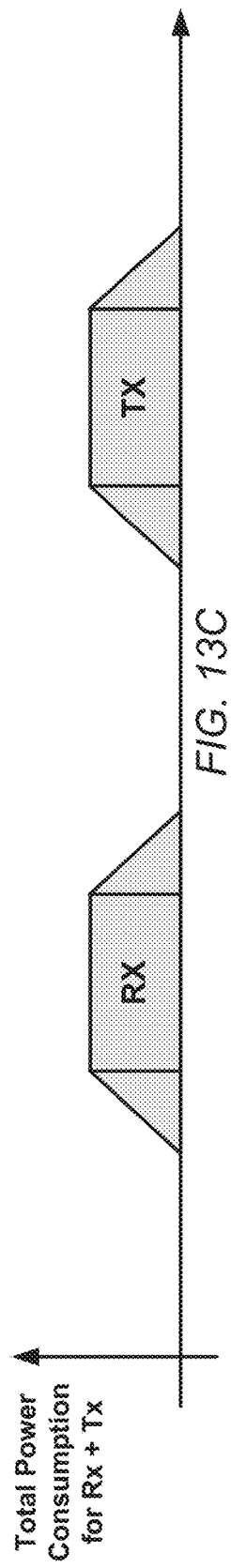
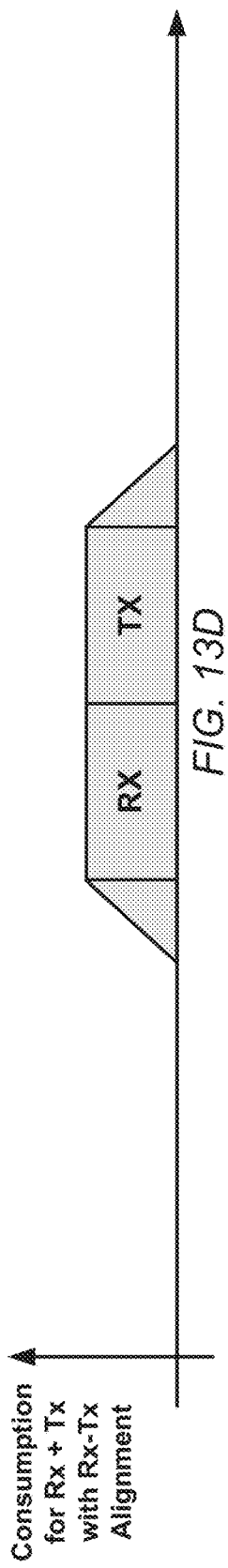

| Profile | UE Behavior |
|---|---|
| P1 | Profile for delayed ACK with PDCCH monitoring |
| P2 | Profile for delayed PUSCH scheduling with PDCCH monitoring |
| P3 | Profile for cross slot scheduling with PDCCH monitoring |
| P4 | Profile for large BWP for large data packet scheduling |
| P5 | Profile for self contained slot scheduling |
| P10 | Profile for power saving = {P1, P2, P3} |
| P11 | Profile for high throughput = {P1, P4} |
| P12 | Profile for low latency = {P5} |
| P13 | Profile for high system capacity |
| P14 | Profile for small data traffic (e.g., voice, SMS) |
| P20 | Profile for PDDCH monitoring period |

FIG. 15

| Profile | Parameter Set |
|---|---|
| P1 | {p, K0+K1=p-1} |
| P2 | {p, K2=p-1} |
| P3 | {p, K0=p-1, K1=0} |
| P4 | {SupportedBWPs={0,1}, SupportedSearchSpacesIndices={0, 1, 2, 3}, SupportedMaxMIMOLayers=2, SupportedK0={1,2}, SupportedK1={0,1}, SupportedK2={1,2}, SupportedSCellsIndices={1, 2, 3}, MaxNumberSCells=2, . . .} |

FIG. 16

SCHEDULING-POWER PROFILE FOR UE POWER SAVINGS

PRIORITY DATA

This application is a continuation of U.S. patent application Ser. No. 16/295,230, titled "Scheduling Profile for UE Power Savings", filed Mar. 7, 2019, which claims benefit of priority to U.S. Provisional Application Ser. No. 62/641,564, titled "Scheduling Profile for UE Power Savings", filed Mar. 12, 2018, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for a wireless device to communicate a scheduling profile, such as a scheduling-power profile, for power savings to a network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of the less restrictive UE scheduling in order to further leverage power savings opportunities.

SUMMARY

Embodiments relate to apparatuses, systems, and methods to schedule a user equipment device (UE) based on a scheduling-power profile.

In some embodiments, a user equipment device may be configured to perform a method to constrain UE communication behavior. The method may include the UE exchanging communications with a base station to determine one or more scheduling profiles, such as one or more scheduling-power profiles. In some embodiments, the communications with the base station to determine the one or more scheduling-power profiles may include exchange of one or more radio resource control (RRC) signal messages. In some embodiments, the one or more scheduling-power profiles may not conflict with one another. In some embodiments, a scheduling-power profile may specify one or more parameters associated with UE communication behavior, e.g., one or more constraints on UE communication behavior and/or slot scheduling of UE communications. In addition, the method may include the UE receiving a slot configuration schedule from the base station. The slot configuration schedule may be based on at least one scheduling-power profile of the one or more scheduling-power profiles. Further, the method may include the UE performing communications with the base station based on the at least one scheduling-power profile.

In some embodiments, the one or more scheduling-power profiles may include a profile that may constrain the base station to schedule transmission of an acknowledgment of data received on the PDCCH to a slot immediately preceding a slot scheduled for PDCCH monitoring. In some embodiments, the one or more scheduling-power profiles may include a profile that constrains the base station to schedule transmission on the PUSCH to a slot immediately preceding a slot scheduled for PDCCH monitoring. In some embodiments, the one or more scheduling-power profiles may include a profile that constrains the base station to cross-slot schedule transmission of an ACK of a PDCCH and a reception on the PDSCH to a slot immediately preceding a slot scheduled for PDCCH monitoring.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 10A-10C illustrate an example of power consumption of a UE for multiple transmissions during PDCCH monitoring.

FIG. 10D illustrates an example of power consumption of a UE for multiple transmissions during PDCCH monitoring, according to some embodiments.

FIGS. 11A-11C illustrate an example of power consumption of a UE for multiple receptions during PDCCH monitoring.

FIG. 11D illustrates an example of power consumption of a UE for multiple receptions during PDCCH monitoring, according to some embodiments.

FIGS. 12A-12C illustrate an example of power consumption of a UE for a transmission followed by a reception during PDCCH monitoring.

FIG. 12D illustrates an example of power consumption of a UE for a transmission followed by a reception during PDCCH monitoring, according to some embodiments.

FIGS. 13A-13C illustrate an example of power consumption of a UE for a reception followed by a transmission during PDCCH monitoring.

FIG. 13D illustrates an example of power consumption of a UE for a reception followed by a transmission during PDCCH monitoring, according to some embodiments.

FIG. 15 illustrates example profiles and correspond UE behaviors, according to some embodiments.

FIG. 16 illustrates example parameter sets for various profiles, according to some embodiments.

Figure 1:
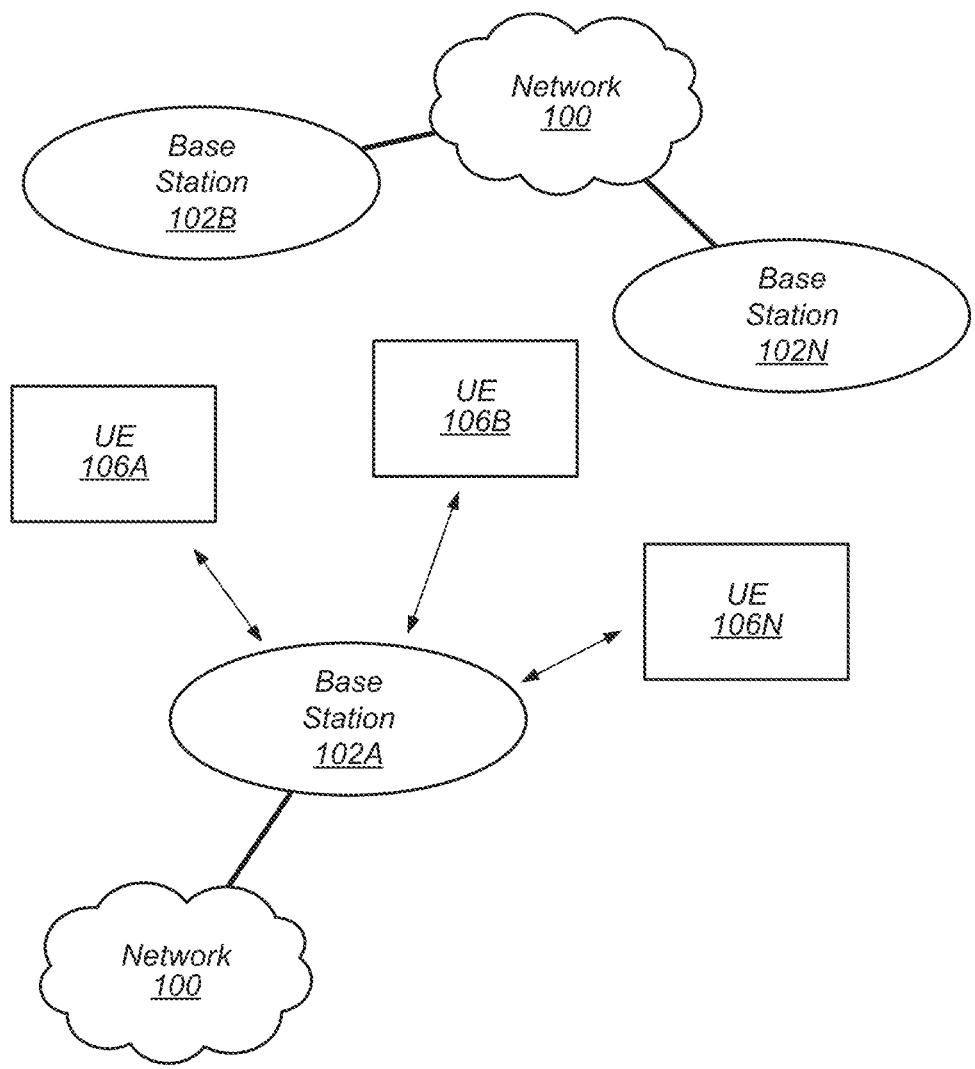
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
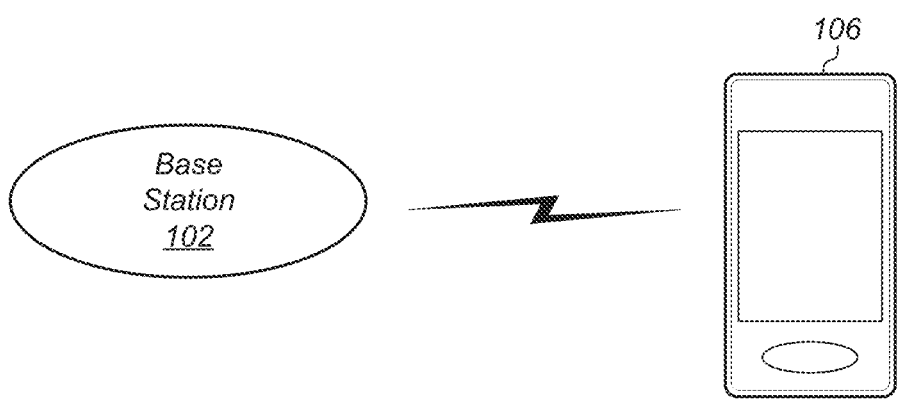
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
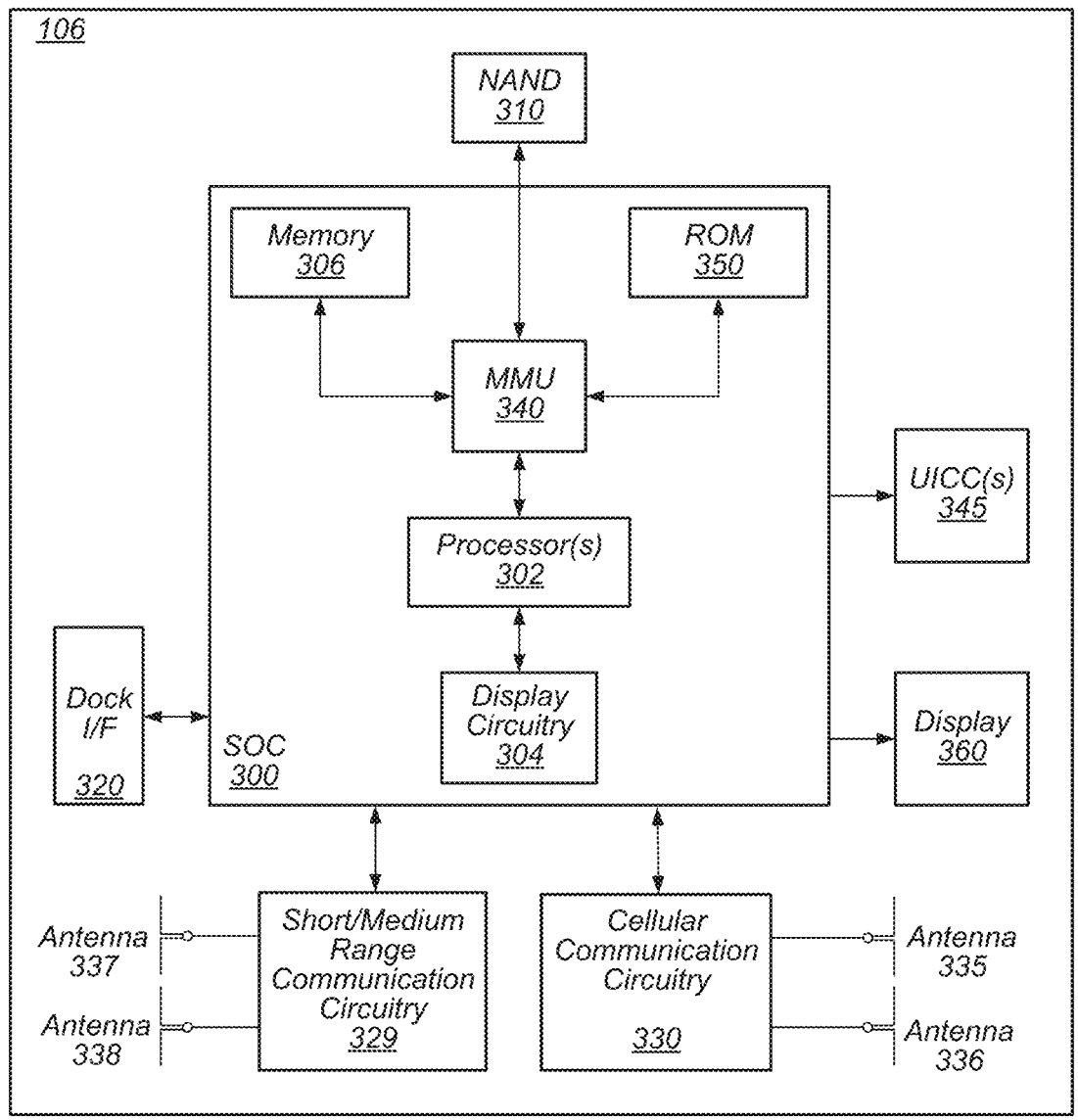
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including the communication device 106 exchanging communications with a base station to determine one or more scheduling-power profiles. In some embodiments, the communications with the base station to determine the one or more scheduling-power profiles may include exchange of one or more radio resource control (RRC) signal messages. In some embodiments, the one or more scheduling-power profiles may not conflict with one another. In some embodiments, a scheduling-power profile may specify one or more parameters associated with communication device 106 communication behavior, e.g., one or more constraints on communication device 106 communication behavior and/or slot scheduling of communication device 106 communications. In addition, the method may include the communication device 106 receiving a slot configuration schedule from the base station. The slot configuration schedule may be based on at least one scheduling-power profile of the one or more scheduling-power profiles. Further, the method may include the communication device 106 performing communications with the base station based on the at least one scheduling-power profile.

As described herein, the communication device 106 may include hardware and software components for implementing the above features for a communication device 106 to communicate a scheduling-power profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
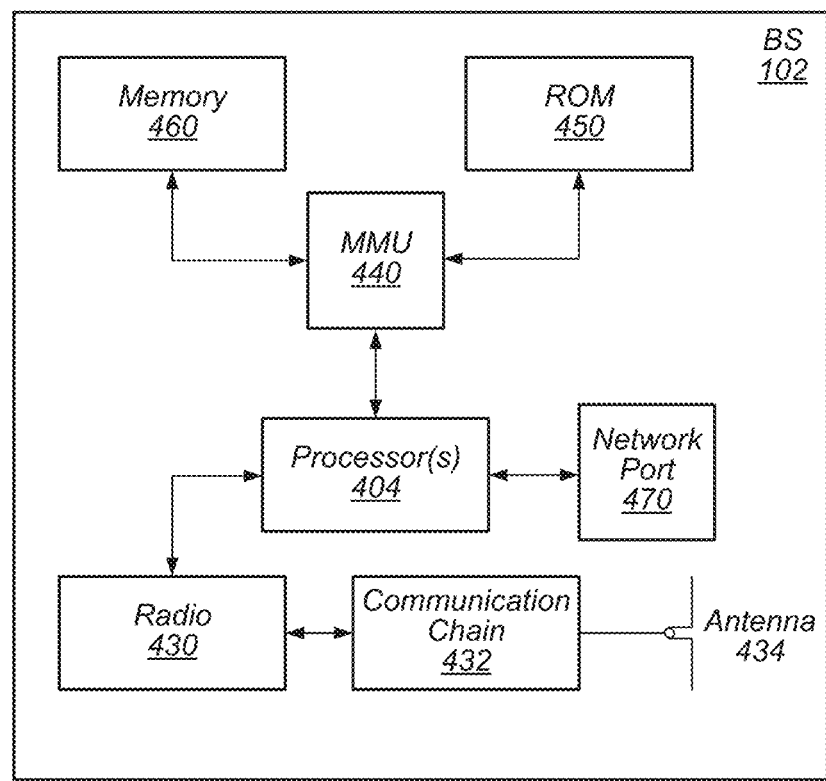
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
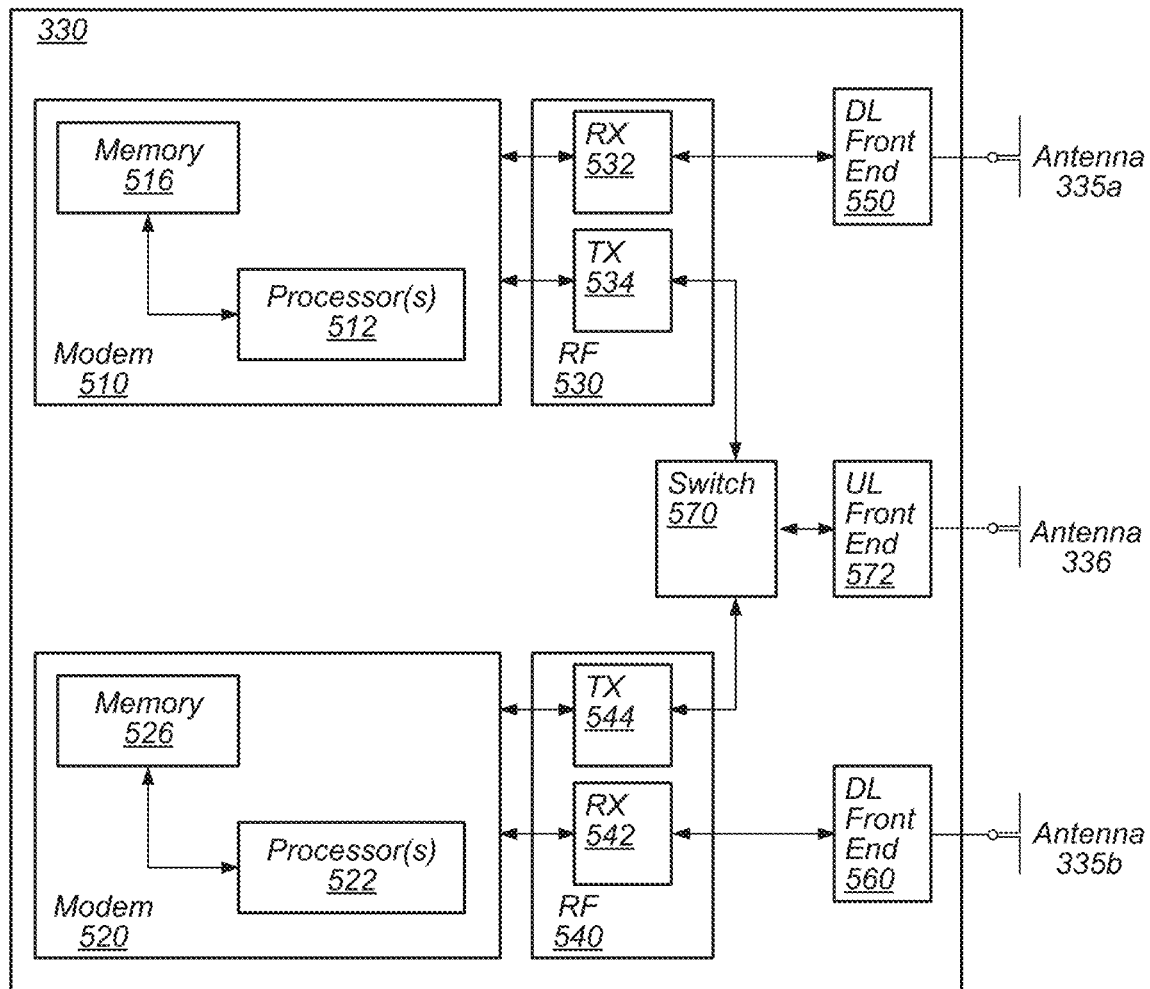
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform a method including exchanging communications with a base station to determine one or more scheduling-power profiles. In some embodiments, the communications with the base station to determine the one or more scheduling-power profiles may include exchange of one or more radio resource control (RRC) signal messages. In some embodiments, the one or more scheduling-power profiles may not conflict with one another. In some embodiments, a scheduling-power profile may specify one or more parameters associated with UE communication behavior, e.g., one or more constraints on UE communication behavior and/or slot scheduling of UE communications. In addition, the method may include receiving a slot configuration schedule from the base station. The slot configuration schedule may be based on at least one scheduling-power profile of the one or more scheduling-power profiles. Further, the method may include performing communications with the base station based on the at least one scheduling-power profile.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling-power profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
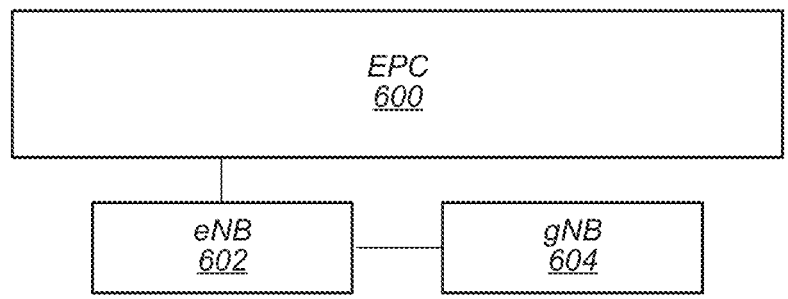
FIG. 6A illustrates an example of connections between an EPC network, an LTE base station (eNB), and a 5G NR base station (gNB).
Figure 6B:
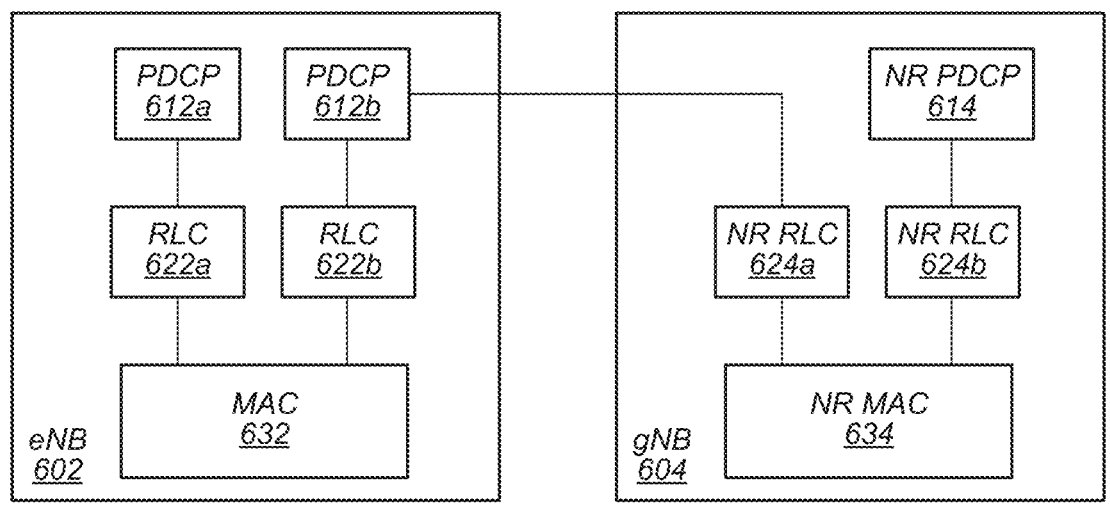
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
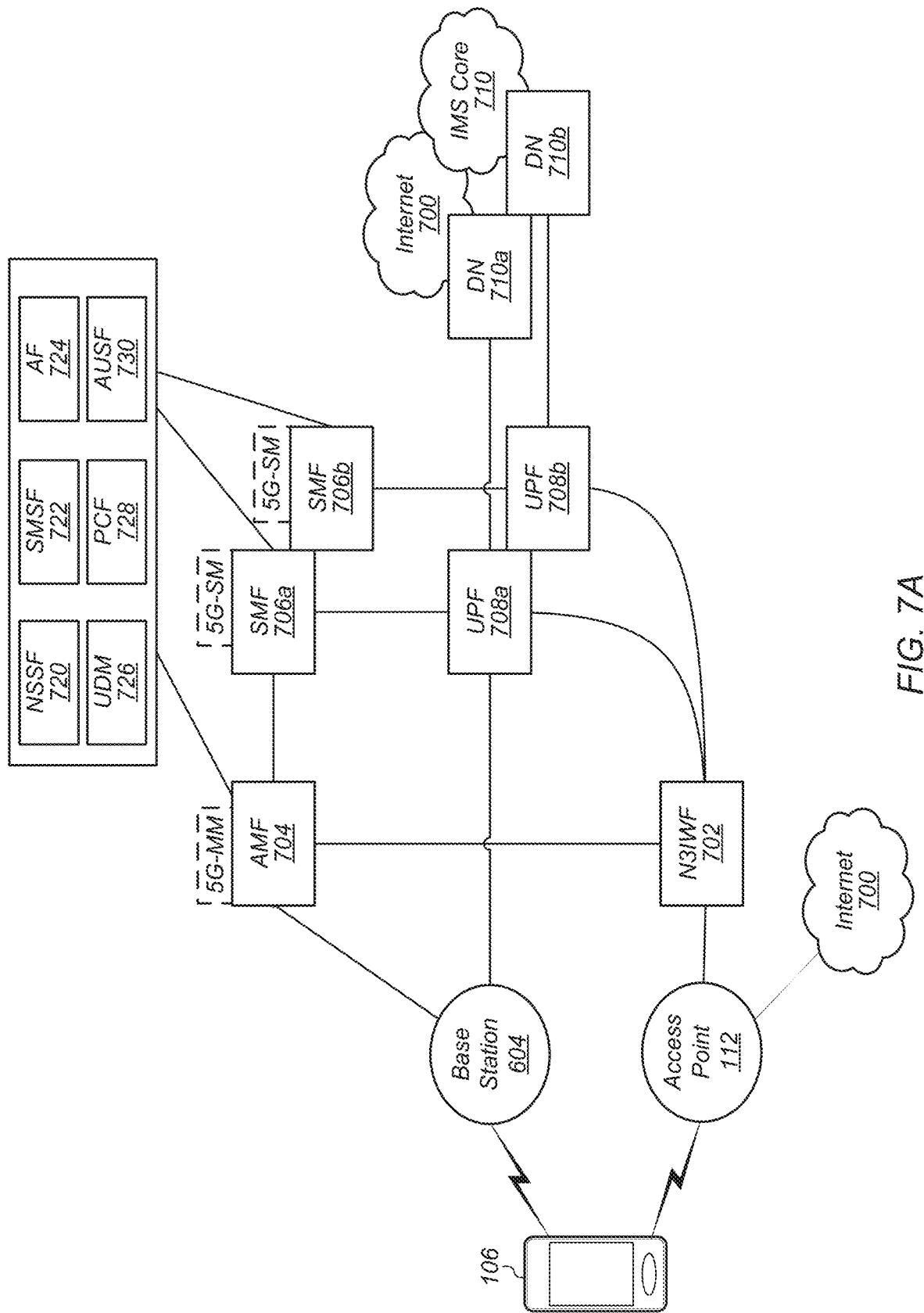
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
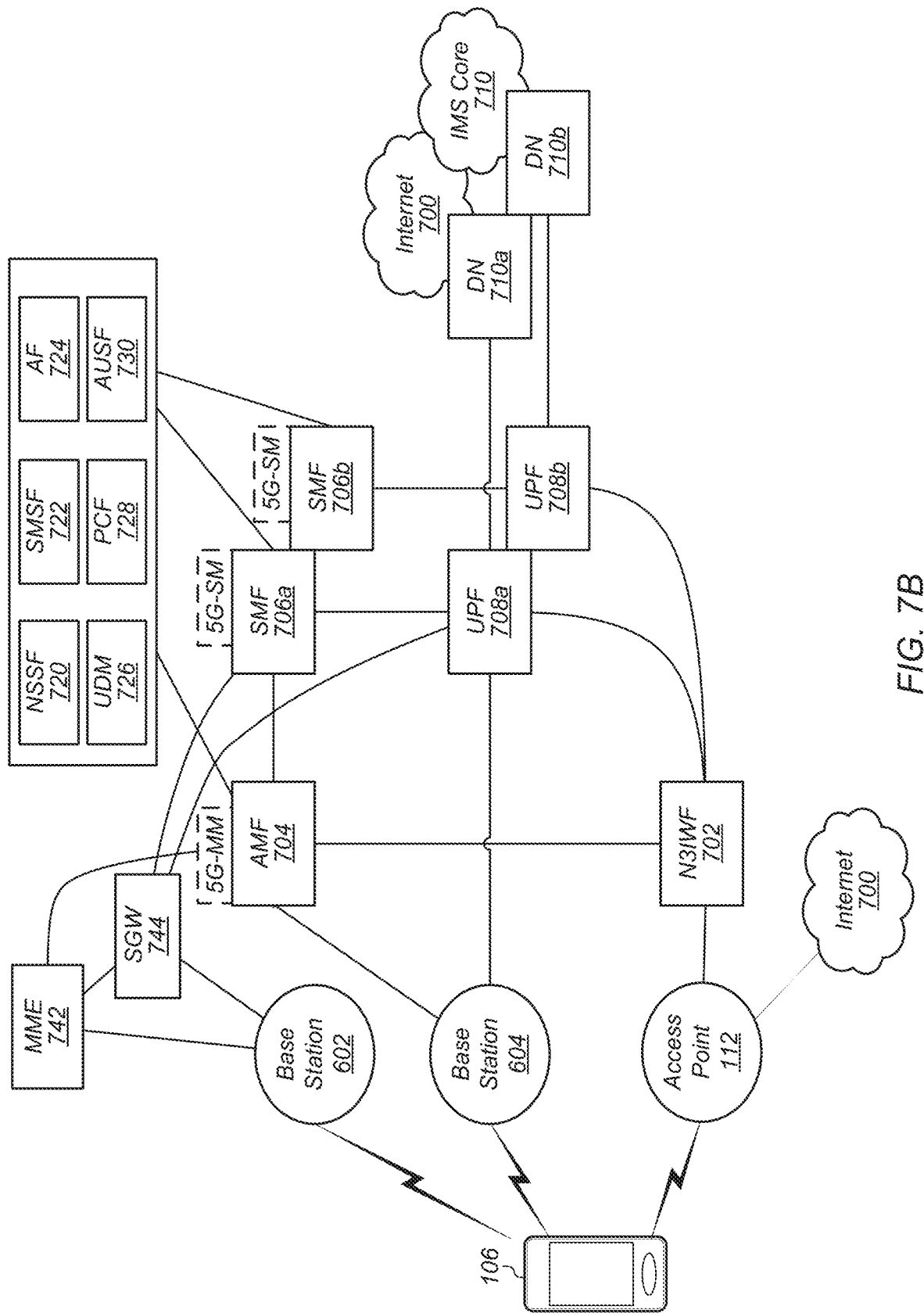
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to schedule a UE based on a scheduling-power profile that may specify one or more parameters associated with UE communication behavior, e.g., one or more constraints on UE communication behavior and/or slot scheduling of UE communications, e.g., as further described herein.

Figure 8:
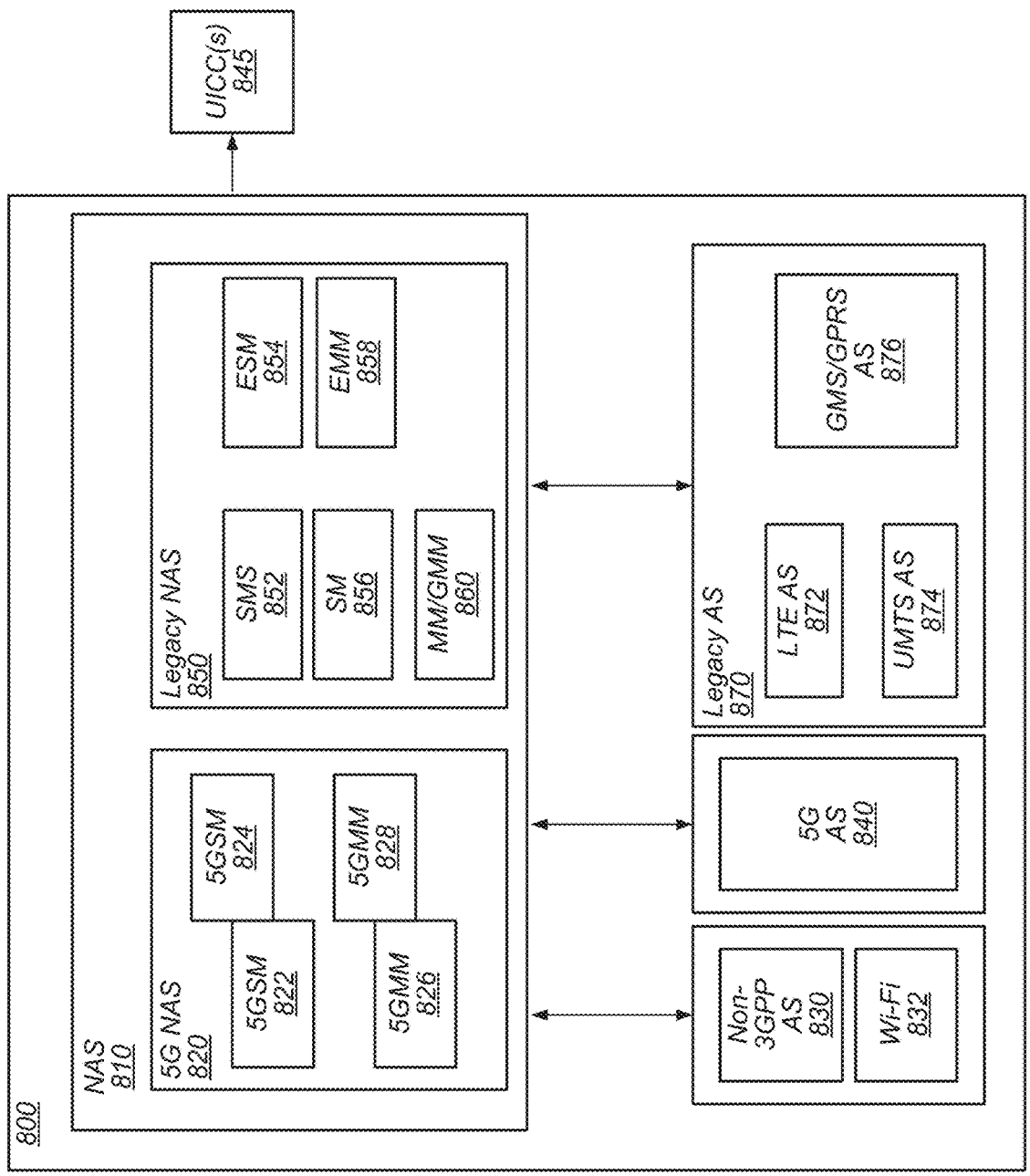
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection.

Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods schedule a UE based on a scheduling-power profile that may specify one or more parameters associated with UE communication behavior, e.g., one or more constraints on UE communication behavior and/or slot scheduling of UE communications, e.g., as further described herein.

UE Scheduling-Power Profile

Figure 9A:
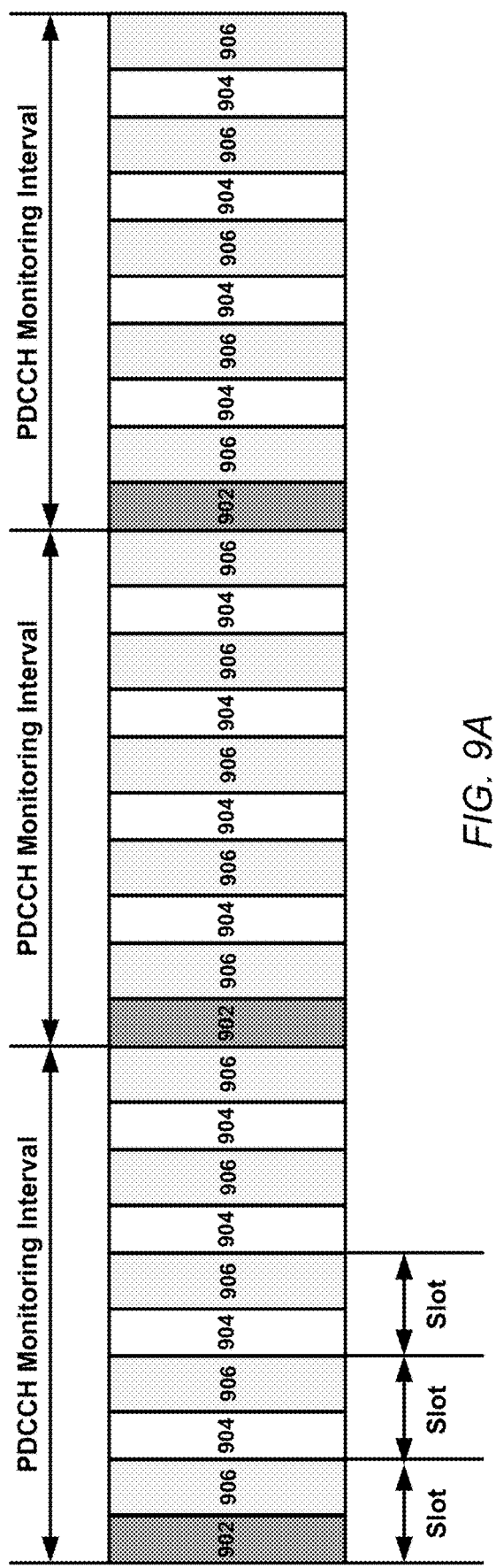
FIG. 9A illustrates an example of a PDCCH monitoring interval.
Figure 9B:
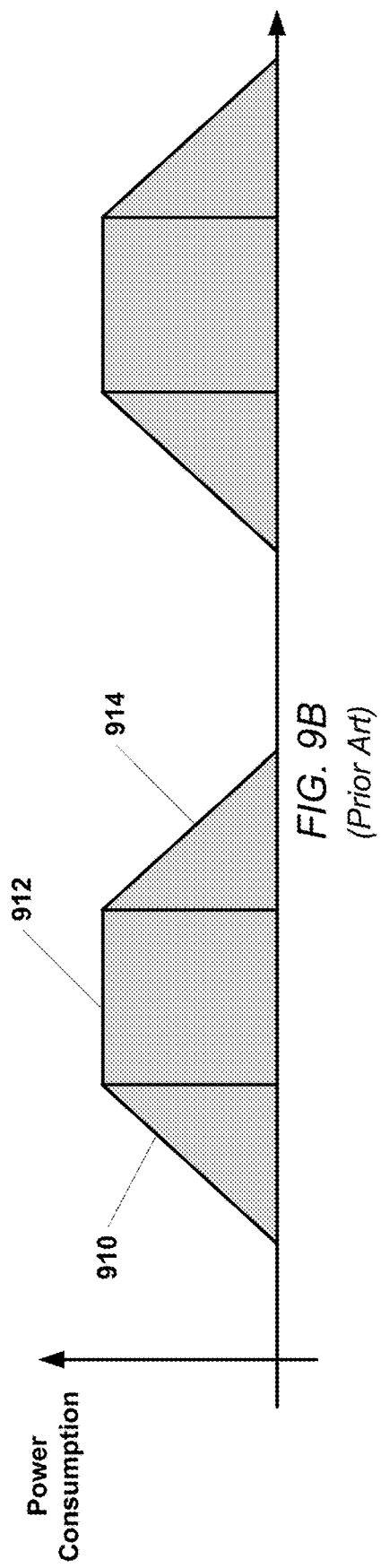
FIG. 9B illustrates an example of power consumption of a UE for multiple PDCCH monitoring slots.

In current implementations of the 5G New Radio (5G NR) standard, a UE may be configured to monitor the Physical Downlink Control Channel (PDCCH) periodically, e.g., as illustrated by FIG. 9A. As shown, the UE may monitor the PDCCH every fifth slot 902 and, if the UE does not have any pending data, the UE may go into a low power mode to reduce power consumption when not monitoring the PDCCH in slots 904. In some implementations, a search space configuration may be enabled to allow the UE to monitor the PDCCH periodically. The power consumption of the UE during periodic monitoring of the PDCCH is illustrated by FIG. 9B. As shown, when no monitoring the PDCCH, the UE may have a very low power consumption; however, the power consumption may ramp up ahead of the monitoring period (e.g., power ramp 910), may remain at maximum power consumption for a period of time before, during, and after the monitoring period (e.g., maximum power level 912), and then may ramp down after the monitoring period is complete (e.g., power ramp 914). For example, when the UE receives data in a slot N (e.g., slot 906 of FIG. 9A), the UE will wake up prior to (before) slot N to prepare for reception of the data. During the wake up, the UE may consume power (e.g., power ramp 910) to prepare (or reinitialize/start) its clock, set its voltage configuration, warm up the UE's radio frequency integrated circuit (RFIC), phase lock loop (PLL) lock, and so forth. After receiving the data in slot N, a modem of the UE may perform decoding and a series of actions for signal decoding and shutting down elements of the UE to reduce power consumption. For example, the UE modem may shut down the RFIC, perform automatic gain control (AGC), update time tracking loops (TTL) and/or frequency tracking loops (FTL), perform channel estimation, and/or perform data decoding. As another example, when the UE transmits data in a slot N (e.g., slot 906 of FIG. 9A), the UE will wake up prior to (before) slot N to prepare for transmission of the data. During the wake up, similar to when the UE is preparing to receive data, the UE may consume power (e.g., power ramp 910) to prepare (or reinitialize/start) its clock, warm up the UE's RFIC, phase lock loop (PLL) lock, encode the data, and so forth. After slot N, the UE may consume power (e.g., power ramp 914) shutting down the RFIC. Thus, turning components on and off for receiving and/or sending data consumes power (especially RFIC ramp up and ramp down).

Embodiments described herein disclose systems and methods for reducing power consumption during wakeup and shut down associated with periodic monitoring of the PDCCH. For example, in some embodiments, the UE may notify a base station (e.g., a gNB) of a scheduling constraint via a scheduling profile, such as a scheduling-power profile. For example, FIGS. 10D, 11D, 12D, and 13D illustrate power savings for various transmit and/or receive scenarios. In some embodiments, the UE may transmit an acknowledgement, transmit data on the PUSCH, and/or transmit other various data and/or control information. In some embodiments, the UE may receive data on the PDCCH and/or on the PDSCH.

FIG. 10D illustrates power savings across two transmissions as compared to current implementations as illustrated by FIGS. 10A-10C, according to some embodiments. In particular, FIGS. 10A-10C illustrate the power consumed for a first transmission (FIG. 10A), the power consumed for a second transmission (FIG. 10B), and the total power consumed across the two transmissions (FIG. 10C). As shown, for each transmission, the UE consumes power to prepare for the transmission, perform the transmission, and then power down after the transmission. However, according to some embodiments and as illustrated by FIG. 10D, when the UE can schedule the transmissions back to back, the UE may avoid the power consumed powering down after the first transmission and powering back up for the second transmission, thereby saving additional power as compared to current implementations.

FIG. 11D illustrates power savings across two receptions as compared to current implementations as illustrated by FIGS. 11A-11C, according to some embodiments. In particular, FIGS. 11A-11C illustrate the power consumed for a first reception (FIG. 11A), the power consumed for a second reception (FIG. 11B), and the total power consumed across the two receptions (FIG. 11C). As shown, for each reception, the UE consumes power to prepare for the reception, perform the reception, and then power down after the reception. However, according to some embodiments and as illustrated by FIG. 11D, when the UE can schedule the receptions back to back, the UE may avoid the power consumed powering down after the first reception and powering back up for the second reception, thereby saving additional power as compared to current implementations.

FIG. 12D illustrates power savings across a transmission followed by a reception as compared to current implementations as illustrated by FIGS. 12A-12C, according to some embodiments. In particular, FIGS. 12A-12C illustrate the power consumed for a transmission (FIG. 12A), the power consumed for a reception (FIG. 12B), and the total power consumed across the transmission and reception (FIG. 12C). As shown, for both the transmission and the reception, the UE consumes power to prepare for the transmission/reception, perform the transmission/reception, and then power down after the transmission/reception. However, according to some embodiments and as illustrated by FIG. 12D, when the UE can schedule the transmission and reception back to back, the UE may avoid the power consumed powering down after the transmission and powering back up for the reception, thereby saving additional power as compared to current implementations.

FIG. 13D illustrates power savings across a reception followed by a transmission as compared to current implementations as illustrated by FIGS. 13A-13C, according to some embodiments. In particular, FIGS. 13A-13C illustrate the power consumed for a reception (FIG. 13A), the power consumed for a transmission (FIG. 13B), and the total power consumed across the reception and transmission (FIG. 13C). As shown, for both the transmission and the reception, the UE consumes power to prepare for the transmission/reception, perform the transmission/reception, and then power down after the transmission/reception. However, according to some embodiments and as illustrated by FIG. 13D, when the UE can schedule the reception and transmission back to back, the UE may avoid the power consumed powering down after the reception and powering back up for the transmission, thereby saving additional power as compared to current implementations.

Figure 14:
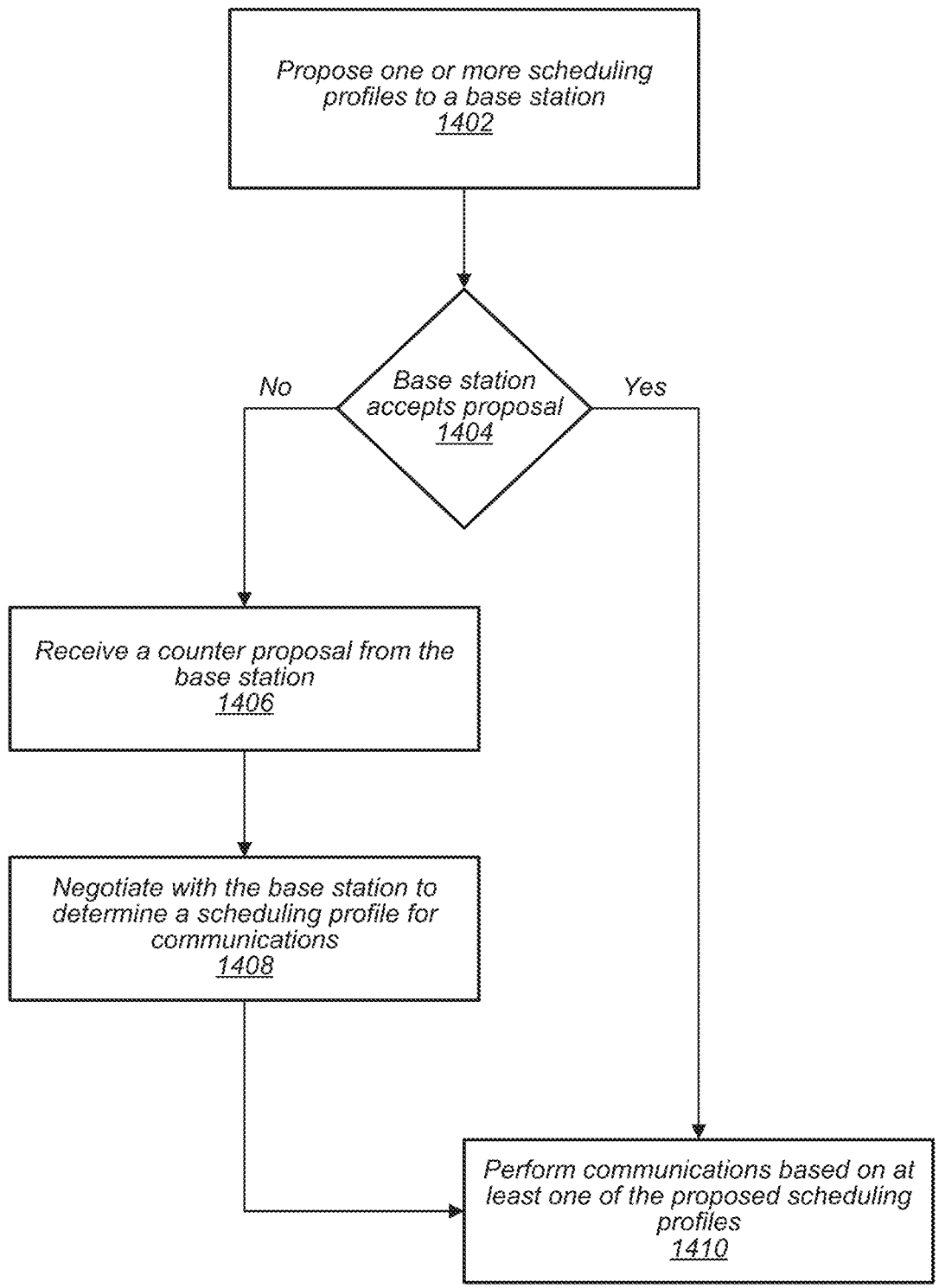
FIG. 14 illustrates a block diagram of an example of a process for determining a scheduling profile for a UE, according to some embodiments.

FIG. 14 illustrates a block diagram of an example of a process for determining a scheduling profile for a UE, according to some embodiments. The process shown in FIG. 14 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 1402, a UE, such as UE 106, may propose one or more scheduling profiles, such as one or more scheduling-power profiles, to a base station, such as base station 102 (which may be configured as a gNB, such as gNB 604). Note that if the UE proposes more than one scheduling-power profile, the scheduling-power profiles may not conflict with one another. In some embodiments, the proposal may be communicated via radio resource control (RRC) signaling message. In some embodiments, a scheduling-power profile may include one or more (or a set of) parameters and/or constraints for system configuration. The parameters (or constraints) may limit network scheduling to a particular configuration. In some embodiments, a scheduling-power profile may include a set of other scheduling-power profiles. In some embodiments, as illustrated by FIG. 15, a scheduling-power profile may specify a particular UE behavior, or sets of behaviors. For example, as shown by FIG. 15, a profile P1 may specify a profile for delayed acknowledgement (ACK) with PDCCH monitoring. As another example, a profile P2 may specify a profile for delayed PUSCH scheduling with PDCCH monitoring. As further example, a profile P3 may specify a profile for cross-slot scheduling with PDCCH monitoring; a profile P4 may specify a profile for large bandwidth part (BWP) for large data packet scheduling; a profile P5 may specify a profile for self-contained slot scheduling; a profile P10 may specify a profile for power savings, e.g., a set of profiles including any, some, or all of profiles P1, P2, and/or P3; a profile P11 may specify a profile for high throughput, e.g., a set of profiles including any, some, or all of profiles P1 and/or P4; a profile P14 may specify a profile for low latency, e.g., a set of profiles including at least profile P5; a profile P15 may specify a profile for high system capacity; a profile P14 may specify a profile for small data traffic, e.g., voice data and or SMS data; a profile P20 may specify a profile for PDCCH monitoring period.

In some embodiments, a scheduling-power profile may include one or more parameters to specify the profile. For example, the parameters may include a set of values for search space monitoring periodicity. As another example, the parameters may include a set of configurable values and/or constraints for K0, where K0 defines a number of slots (e.g., from 0 to n) between a slot scheduled for the PDCCH and a slot scheduled for PDSCH. As a further example, the parameters may include a set of configurable values and/or constraints for K1, where K1 defines a number of slots (e.g., from 0 to n) between a slot scheduled for the PDSCH and a slot scheduled for an acknowledgment. As yet another example, the parameters may include a set of configurable values and/or constraints for K2, where K2 defines a number of slots (e.g., from 0 to n) between a slot scheduled for the PDCCH and a slot scheduled for the PUSCH. In addition, the parameters may include minimum and/or maximum bandwidth values and/or constraints in BWPs, a set of supported number of multiple-input-multiple-output (MIMO) layers, search space indices, control resource set (CORESET) indices, BWP indices, secondary cell (Scell) indices, maximum number of Scells, DRX configurations, and so forth. Note that in some embodiments, differing profiles may include differing parameters and/or constraints. In other words, a first profile may include a first combination of the above discussed parameters, among other parameters and a second profile may include a second combination of the above discussed parameters.

FIG. 16 illustrates example parameter sets for various profiles, according to some embodiments. As shown, a profile P1 may include various parameters for supporting delayed ACK with following PDCCH monitoring, such as a first parameter, p, where p specifies search space monitoring periodicity, and a second parameter defining a relationship between K0, K1, and p. In addition, a profile P2 may include various parameters for supporting delayed PUSCH with following PDCCH monitoring, such as a first parameter, p, where p specifies search space monitoring periodicity, and a second parameter defining a relationship between K2 and p. Further, a profile P3 may include various parameters for supporting delayed cross-slot scheduling with following PDCCH monitoring, such as a first parameter, p, where p specifies search space monitoring periodicity, and a second parameter defining a relationship between K0, and p, and a third parameter specifying a value of K1. Additionally, a profile P4 may include various parameters for supporting a low traffic rate, such as supported BWPs, supported search space indices, supported MIMO layers, supported values of K0, K1, and K2, supported Scell indices, supported number of S cells, and so forth.

Returning to FIG. 14, at 1404, the base station may determine whether to accept the scheduling proposal (e.g., the one or more scheduling-power profiles proposed by the UE at 1402). The determination may be based, at least in part, on network scheduling constraints such as whether the base station has pending data for the UE, whether the base station has previously accepted scheduling proposals (from the UE and/or from other UEs served by the base station) that conflict with the UE's proposal, channel conditions, and so forth. If the base station accepts the scheduling proposal the process may continue at 1410. Alternatively, if the base station does not accept the scheduling proposal, the process may continue at 1406.

At 1406, if the base station determines to not accept the scheduling proposal, the base station may communicate a counter proposal to the UE. In response, at 1408, the base station and UE may negotiate (e.g., via an exchange of one or more additional proposals) to determine a scheduling-power profile (or scheduling-power profiles) for UE communications. Note that the UE and the base station may agree on more than one scheduling-power profile so long as the multiple profiles do not conflict with one another. In other words, in some embodiments, the base station (network) may configure the UE with multiple profiles. In some embodiments, one or more scheduling-power profiles may be active, where an active profile may be a profile currently being used between the base station and the UE.

At 1410, the UE and base station may communicate based on at least one of the agreed upon scheduling-power profiles (e.g., active profiles). For example, if a first profile specifies UE behavior when transmitting an acknowledgment (ACK) while performing PDCCH monitoring, the base station may schedule the ACK in a slot consecutive to the PDCCH monitoring based on a search space monitoring periodicity included in the first profile, e.g., as further described below in reference to FIG. 17. Similarly, if a second profile specifies UE behavior when transmitting on the PUSCH while performing PDCCH monitoring, the base station may schedule the PUSCH transmission in a slot consecutive to the PDCCH monitoring based on a search space monitoring periodicity included in the second profile, e.g., as further described below in reference to FIG. 18. Further, if a third profile specifies UE behavior for cross-slot scheduling while performing PDCCH monitoring, the base station may schedule the UE transmissions and receptions based on parameters included in a third profile, e.g., as further described below in reference to FIG. 19. Further, if a fourth profile specifies a self-contained slot, the base station may schedule the UE transmissions and receptions based on parameters included in a fourth profile, e.g., as further described below in reference to FIG. 20.

Figure 17:
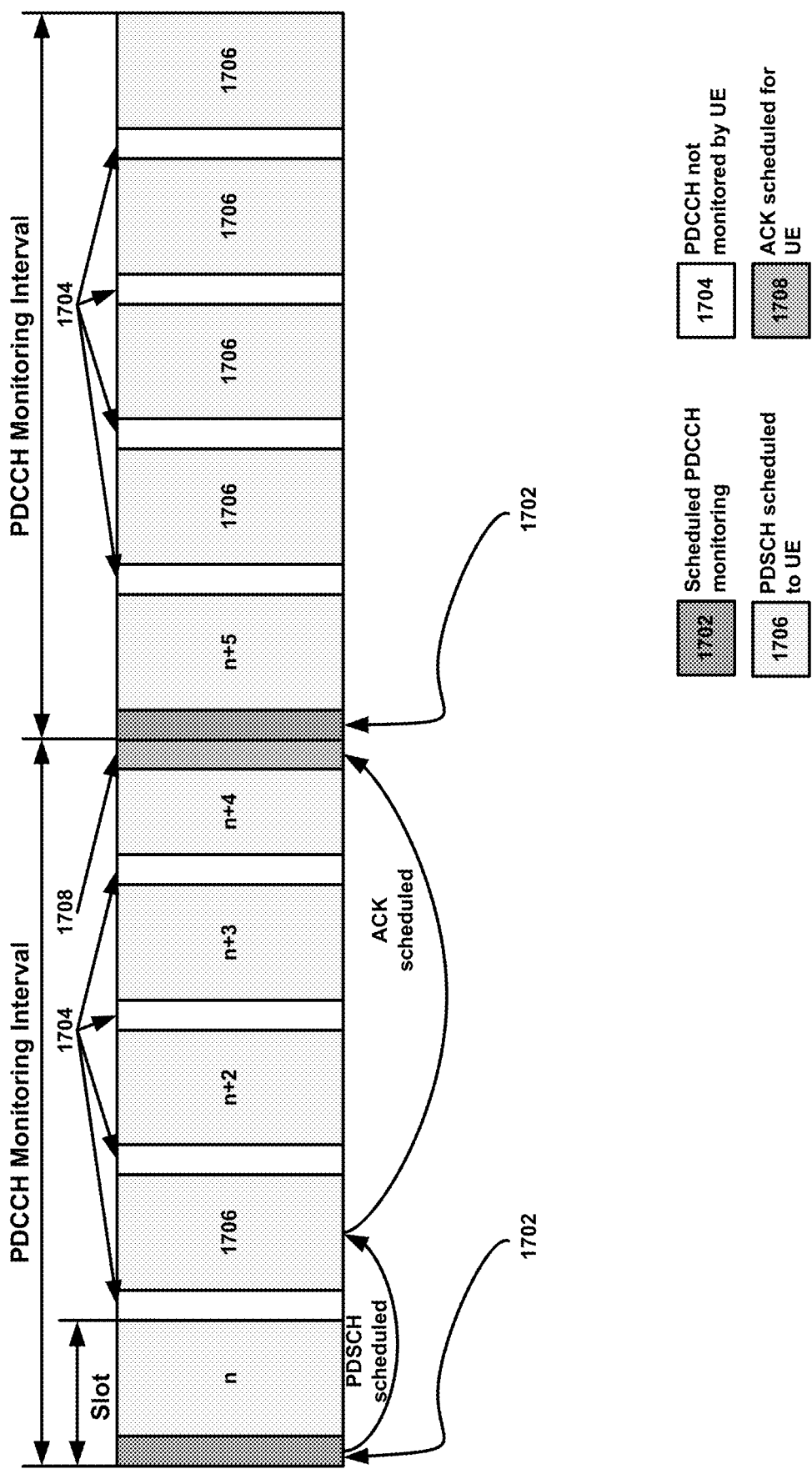
FIG. 17 illustrates an example of a delayed acknowledgement with following PDCCH monitoring, according to some embodiments.

FIG. 17 illustrates an example of a delayed acknowledgement with following PDCCH monitoring, according to some embodiments. For example, if a UE, such as UE 106, is supposed to transmit an acknowledgement (ACK) in uplink (UL) and monitor PDCCH in similar timing, then the network (e.g., base station 102, gNB 604) may schedule (e.g., based in part on an agreed upon scheduling-power profile) the ACK transmission 1708 just before scheduled PDCCH monitoring 1702 occurs such that UE transmit and UE receive may occur in consecutive (e.g., back-to-back) time slots. Such a scheduling scheme may allow the UE to save power by avoiding a ramp down (e.g., after transmitting the ACK) and a ramp up (e.g., before scheduled PDCCH monitoring 1702). As shown in FIG. 17, the UE may be configured to monitor the PDCCH every 5 time slots, thus, if the UE receives PDSCH in slot n (e.g., scheduling the PDSCH to the UE at 1706), the UE would typically transmit a corresponding ACK in slot n+1. However, in some embodiments, a scheduling-power profile may delay the corresponding ACK until slot n+4, as shown, thereby allowing the UE to save power by avoiding an RFIC ramp down and an RFIC ramp up. Note that the UE may not monitor the PDCCH at slots 1704. Note further that the scheduling-power profile may be determined based, at least in part, on a communication configuration condition and/or a UE constraint. Thus, according to the example of FIG. 17, the communication configuration condition may include that the UE is configured with at least a PDCCH monitoring period of p, where p defines a number of time slots between PDCCH monitoring and p is greater than 1. The UE constraint may be back-to-back (or consecutive) or very close (e.g., one slot gap) ACK and PDCCH monitoring. In other words, when the UE is configured to monitor PDCCH in slot n, an ACK for a PDSCH may be scheduled one time slot ahead of the PDCCH monitoring, e.g., time slot n−1, such that the transmission (ACK) and reception (PDCCH monitoring) may occur without an RFIC ramp down and an RFIC ramp up in between. Hence, if such a scheduling-power profile is enabled (e.g., an RRC parameter PS_ACK_Schedule is set to "true" or "1"), then the network may make scheduling decisions (e.g., such as ACK transmission timing) to satisfy the UE constraint.

Figure 18:
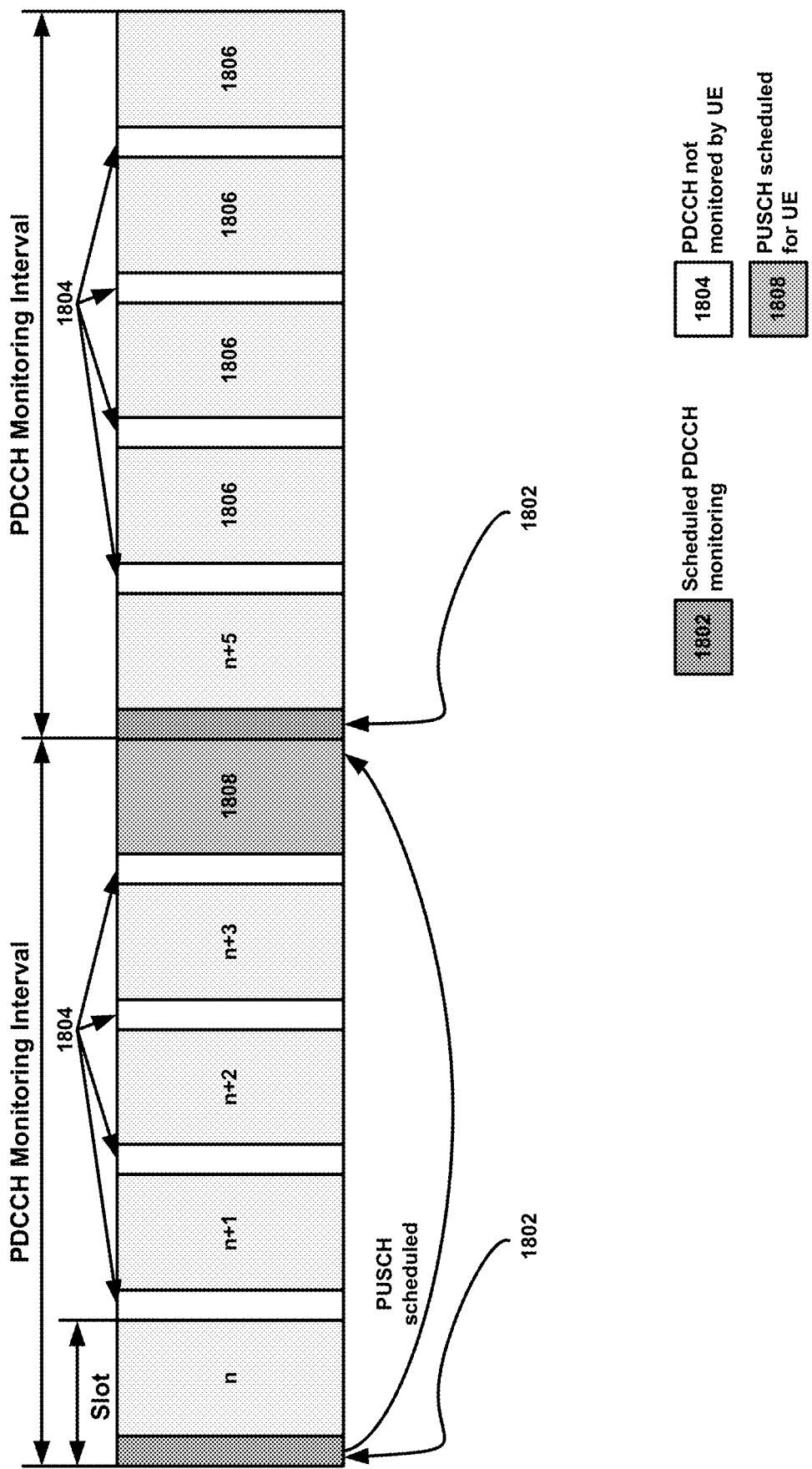
FIG. 18 illustrates an example of a delayed PUSCH with following PDCCH monitoring, according to some embodiments.

FIG. 18 illustrates an example of a delayed PUSCH with following PDCCH monitoring, according to some embodiments. For example, if a UE, such as UE 106, is supposed to transmit PUSCH while performing PDCCH monitoring, then the network (e.g., base station 102, gNB 604) may schedule (e.g., based in part on an agreed upon scheduling-power profile) the PUSCH 1808 to be transmitted in a time slot immediately preceding a scheduled PDCCH monitoring time slot 1802 such that the UE may transmit and receive in consecutive (back to back) time slots. Such a scheduling scheme may allow the UE to save power by avoiding a ramp down (e.g., after transmitting on the PUSCH) and a ramp up (e.g., before scheduled PDCCH monitoring). As shown in FIG. 18, the UE may be configured to monitor the PDCCH every 5 time slots, thus, if the UE is scheduled to transmit PUSCH in slot n+4 and monitor PDCCH in the next slot (e.g., in slot n+5), then the UE may save power by avoiding an RFIC ramp down and an RFIC ramp up. Note that the UE may not monitor the PDCCH at slots 1804. Note further that the scheduling-power profile may be determined based, at least in part, on a communication configuration condition and/or a UE constraint. Thus, according to the example of FIG. 18, the communication configuration condition may include that the UE is configured with at least a PDCCH monitoring period of p, where p defines a number of time slots between PDCCH monitoring and p is greater than 1. The UE constraint may be back-to-back (or consecutive) PUSCH transmission and PDCCH monitoring. In other words, when the UE is configured to monitor PDCCH in slot n, a PUSCH transmission may be scheduled one time slot ahead of the PDCCH monitoring, e.g., time slot n−1, such that the transmission (PUSCH) and reception (PDCCH monitoring) may occur without an RFIC ramp down and an RFIC ramp up in between. Hence, if such a scheduling-power profile is enabled (e.g., an RRC parameter PS PUSCH Schedule is set to "true" or "1"), then the network may make scheduling decisions (e.g., such as PUSCH transmission timing) to satisfy the UE constraint.

Figure 19:
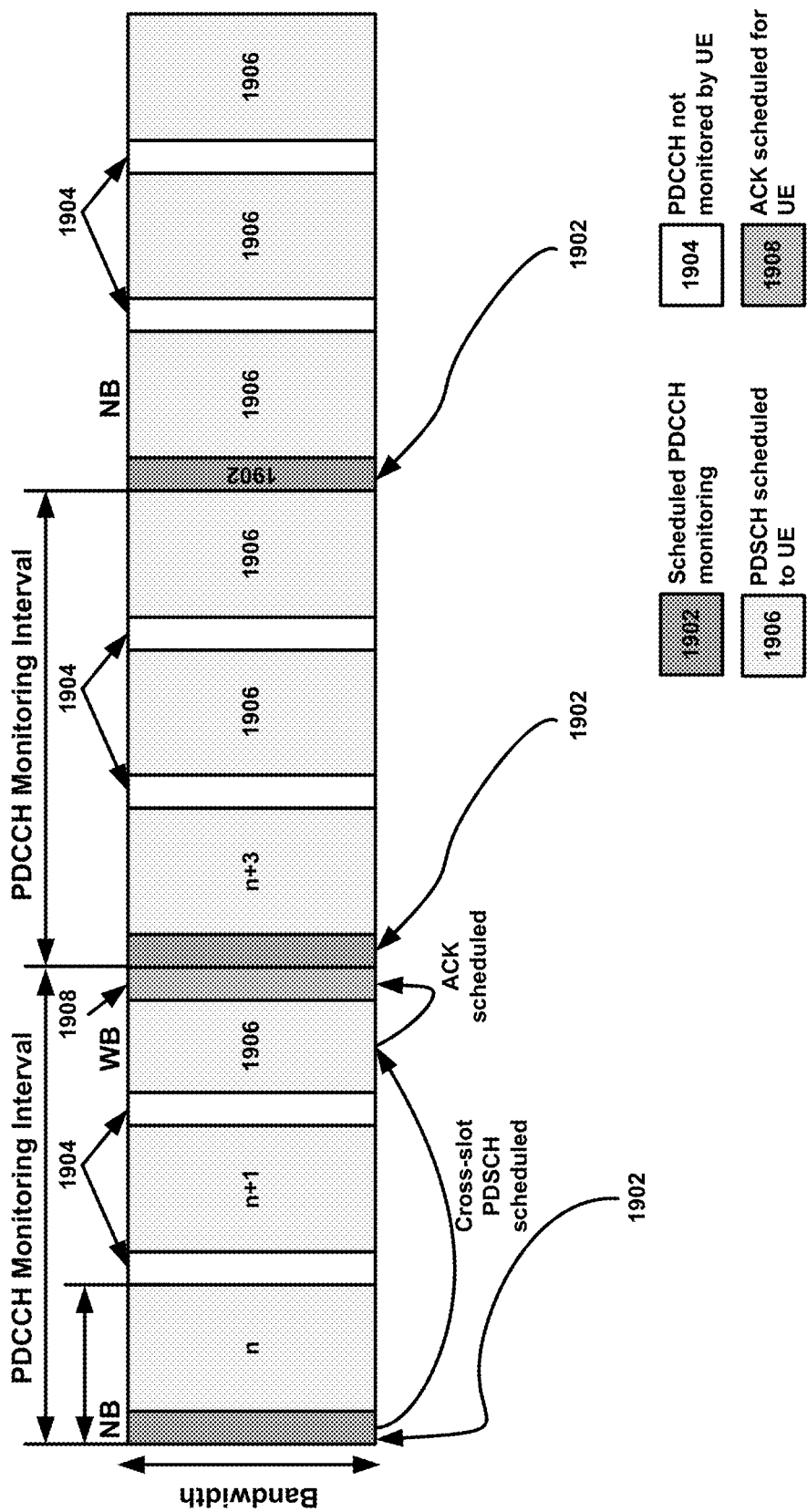
FIG. 19 illustrates an example of delayed cross-slot scheduling with following PDCCH monitoring, according to some embodiments.

FIG. 19 illustrates an example of delayed cross-slot scheduling with following PDCCH monitoring, according to some embodiments. For example, if a UE, such as UE 106, is supposed to receive on the PDSCH while performing PDCCH monitoring 1902, then the network (e.g., base station 102, gNB 604) may schedule (e.g., based in part on an agreed upon scheduling-power profile) the PDSCH reception 1906 and an ACK transmission 1908 in a time slot immediately preceding a scheduled PDCCH monitoring time slot 1902 such that the UE may transmit and receive in consecutive (back to back) time slots. Such a scheduling scheme may allow the UE to save power by avoiding a ramp down (e.g., after transmitting on the PUSCH) and a ramp up (e.g., before scheduled PDCCH monitoring). Note that the UE may not monitor the PDCCH at slots 1904. Note further that when the UE receives on the PDCCH only, the UE may use a narrow band (NB), however, if the UE also receives on the PDSCH, the UE may open up its radio frequency bandwidth to a wider bandwidth (WB) to receive data on the PDSCH. Thus, to take advantage of bandwidth adaptation with transmit-receive alignment, PDSCH and ACK may be scheduled in a time slot immediately preceding scheduled PDCCH monitoring. As shown in FIG. 19, the UE may be configured to monitor the PDCCH every 3 time slots, thus, if the UE is scheduled to receive on the PDSCH in slot n+2 and an ACK of the PDCCH monitoring is delayed to slot n+2, then the UE may monitor PDCCH in the next slot (e.g., in slot n+3), thereby allowing the UE to save power by avoiding an RFIC ramp down and an RFIC ramp up while also taking advantage of bandwidth adaptation. Note that the scheduling-power profile may be determined based, at least in part, on a communication configuration condition and/or a UE constraint. Thus, according to the example of FIG. 19, the communication configuration condition may include that the UE is configured with at least a PDCCH monitoring period of p, where p defines a number of time slots between PDCCH monitoring and p is greater than 1, and cross-slot scheduling may be enabled. The UE constraint may be K0 greater than 0 (which may allow the UE to monitor PDCCH with narrow BWP and receive PDSCH with wide BWP) and K1=0 (which may ensure PDSCH reception and ACK transmission occur in a common (same) time slot), where K0 defines a number of slots (e.g., from 0 to n) between a slot scheduled for the PDCCH and a slot scheduled for PDSCH and K1 defines a number of slots (e.g., from 0 to n) between a slot scheduled for the PDSCH and a slot scheduled for an acknowledgment. In other words, when the UE is configured to monitor PDCCH in slot n, a PDSCH reception and ACK transmission may be scheduled one time slot ahead of the PDCCH monitoring, e.g., time slot n−1, such that the reception (PDSCH)/transmission (ACK) and reception (PDCCH monitoring) may occur without an RFIC ramp down and an RFIC ramp up in between. Hence, if such a scheduling-power profile is enabled (e.g., an RRC parameter PS_K1_equal_0 is set to "true" or "1"), then the network may make scheduling decisions (e.g., such as ACK transmission timing and PDSCH reception) to satisfy the UE constraint.

Figure 20:
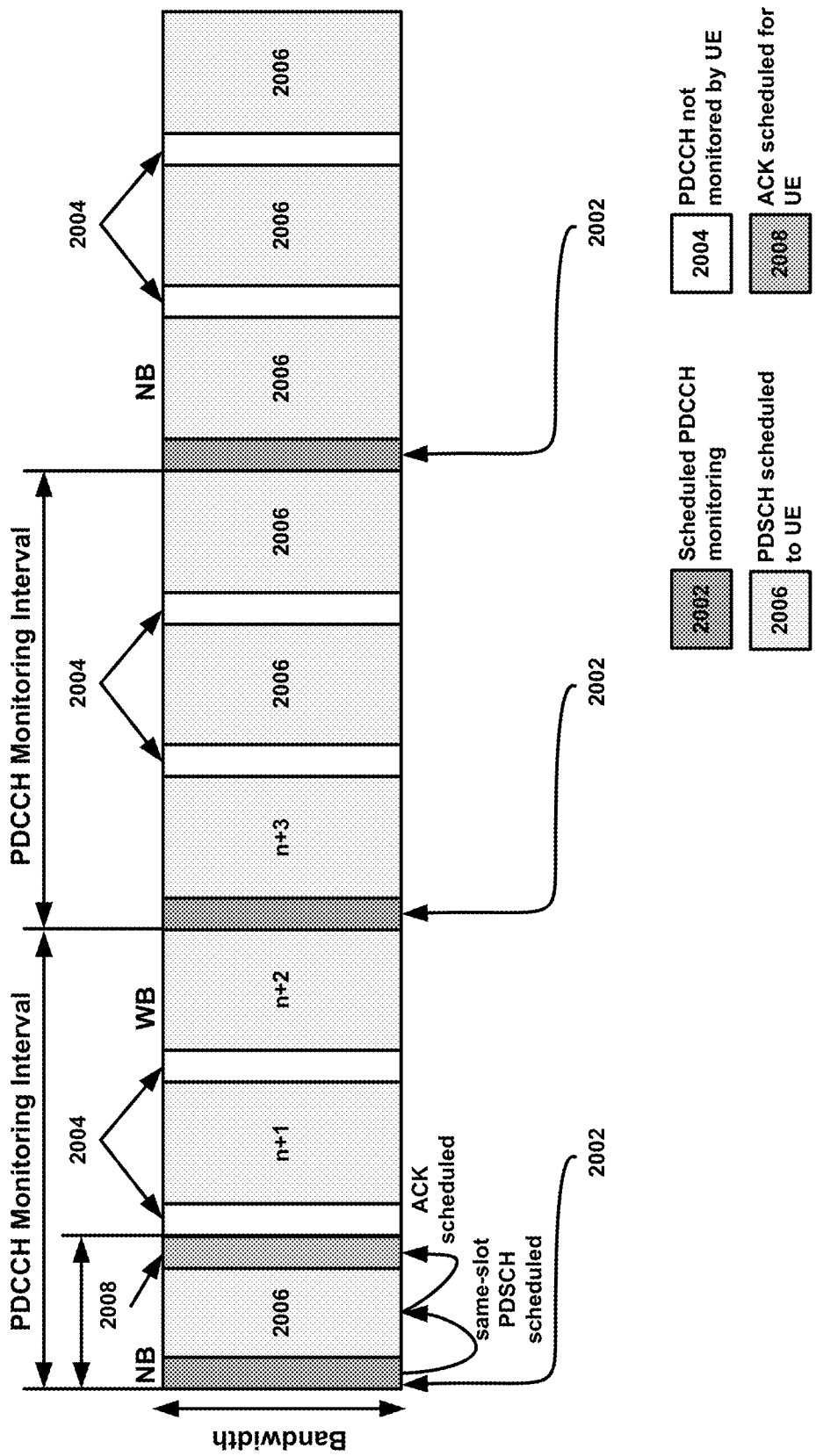
FIG. 20 illustrates an example of self-contained slot scheduling with following PDCCH monitoring, according to some embodiments.

FIG. 20 illustrates an example of self-contained slot scheduling with following PDCCH monitoring, according to some embodiments. For example, if a UE, such as UE 106, is supposed to receive on the PDSCH while performing PDCCH monitoring 2002, then the network (e.g., base station 102, gNB 604) may schedule (e.g., based in part on an agreed upon scheduling-power profile) the PDSCH reception 2006 and an ACK transmission 2008 in a time slot with a scheduled PDCCH monitoring time slot 2002 such that the UE may transmit and receive in a single time slot. Such a scheduling scheme may allow the UE to save power by avoiding a ramp down (e.g., after receiving on the PDCCH and after receiving PDSCH) and a ramp up (e.g., before receiving scheduled PDSCH and before sending ACK). As shown in FIG. 20, the UE may be configured to monitor the PDCCH every 3 time slots, thus, if the UE is scheduled to receive on the PDSCH in slot n, then an ACK of the PDSCH are also scheduled in slot n. Such a scheme may allow the UE to save power by avoiding an RFIC ramp down and an RFIC ramp up. Note that the UE may not monitor the PDCCH at slots 2004. Note further that the scheduling-power profile may be determined based, at least in part, on a communication configuration condition and/or a UE constraint. Thus, according to the example of FIG. 20, the communication configuration condition may include that the UE is configured with at least a PDCCH monitoring period of p, where p defines a number of time slots between PDCCH monitoring and p is greater than 1, and same slot scheduling may be enabled. The UE constraint may be K0=0 (which may allow the UE to monitor PDCCH with narrow BWP and receive PDSCH with wide BWP) and K1=0 (which may ensure PDSCH reception and ACK transmission occur in a common (same) time slot), where K0 defines a number of slots (e.g., from 0 to n) between a slot scheduled for the PDCCH and a slot scheduled for PDSCH and K1 defines a number of slots (e.g., from 0 to n) between a slot scheduled for the PDSCH and a slot scheduled for an acknowledgment. In other words, when the UE is configured to monitor PDCCH in slot n, a PDSCH reception and ACK transmission may be scheduled in a single slot with the PDCCH monitoring, e.g., time slot n, such that the reception (PDSCH)/transmission (ACK) and reception (PDCCH monitoring) may occur without an RFIC ramp down and an RFIC ramp up in between. Hence, if such a scheduling-power profile is enabled (e.g., an RRC parameter K0_K1_equal_0 is set to "true" or "1"), then the network may make scheduling decisions (e.g., such as ACK transmission timing and PDSCH reception) to satisfy the UE constraint.

As discussed above, in some embodiments, one or multiple profiles may be active (e.g., configured for use) for data transfer between a UE, such as UE 106, and a base station (network), such as base station 102, gNB 604. In some embodiments, profiles may be dynamically changed (or switched), e.g., in response to traffic arrival rate increases and/or decreases, traffic delay requirement changes, power consumption requirement changes, and so forth. In some embodiments, the dynamic change may be triggered via explicit signaling between the network and UE. For example, the network may send an explicit signal to the UE to change an active profile to be used for a data transfer. As another example, the UE may send an explicit signal to the network to request change of an active profile to be used for a data transfer. In some embodiments, the dynamic change may be triggered (additionally and/or alternatively) based on a timer. For example, an active profile to be used for a data transfer may change based on a timer operation.

In some embodiments, the network (e.g., gNB 604, base station 102) may indicate a profile to use to a UE, such as UE 106 via signaling using downlink control information (DCI), a medium access control (MAC) control element (CE), and/or radio resource control (RRC) signaling. For example, the network may send (transmit) a signal (e.g., an indication included in DCI, a MAC CE, and/or in RRC signaling) that may indicate to the UE to use a high throughput profile when there is a large amount of data to deliver to the UE. As another example, the network may send (transmit) a signal (e.g., an indication included in DCI, a MAC CE, and/or in RRC signaling) that may indicate to the UE to use a power saving profile when traffic arrival rate decreases below a threshold. As a further example, the network may send (transmit) a layer 1 (L1) to indicate to the UE to use a low latency profile when supported traffic requires low latency.

In some embodiments, the UE may send (transmit) a profile change request signal to the network. For example, when a UE knows that a downlink file transfer has been finished and may want to switch to a power saving profile. In other words, in response to completion of a downlink file transfer, the UE may request a profile change to a power saving profile.

In some embodiments, a profile change may be based, at least in part, on a timer operation. For example, a default profile may be configured. In addition, a timer (e.g., a ProfileActiveTimer timer) may be defined. The timer may be started, restarted, and/or reset when the network activates a new set of profiles. Additionally, the timer may be reset based on a condition obtaining. For example, in some embodiments, the condition may include data arrival rate exceeding a threshold, a number of PDSCH slots scheduled for a specified number of slots exceeds a threshold, and so forth. In some embodiments, upon timer expiration, a current active profile may be deactivated (disabled) and a default profile may be activated (enabled). In some embodiments, the default profile may be updated periodically, e.g., via the network.

Further Embodiments

In some embodiments, a method may include a user equipment device, such as UE 106:
exchanging communications with a base station to determine one or more scheduling profiles, such as one or more scheduling-power profiles, wherein a scheduling-power profile specifies one or more parameters and/or constraints on UE communication behavior;
receiving a slot configuration schedule based on at least one scheduling-power profile of the one or more scheduling-power profiles; and
performing communications with the base station based on the at least one scheduling-power profile.

In some embodiments, the communications with the base station to determine the one or more scheduling-power profiles may include (comprise) radio resource control (RRC) signal message exchanges.

In some embodiments, the one or more scheduling-power profiles may not conflict with one another.

In some embodiments, the one or more scheduling-power profiles may include (comprise) one or more of:
a profile for delayed acknowledgement (ACK) with physical downlink control channel (PDCCH) monitoring;
a profile for delayed physical uplink shared channel (PUSCH) scheduling with PDCCH monitoring;
a profile for cross-slot scheduling with PDCCH monitoring;
a profile for large bandwidth part (BWP) for large data packet scheduling;
a profile for self-contained slot scheduling;
a profile for power savings;
a profile for high throughput;
a profile for low latency;
a profile for high system capacity;
a profile for small data traffic; and/or
a profile for PDCCH monitoring period.

In some embodiments, the one or more parameters and/or constraints may include (comprise) one or more of:
a first parameter defining a set of values for search space monitoring periodicity;
a second parameter defining a number of slots between a slot scheduled for reception on the PDCCH and a slot scheduled for reception on the physical downlink shared channel (PDSCH);
a third parameter defining a number of slots between a slot scheduled for reception on the PDSCH and a slot scheduled for an acknowledgment;
a fourth parameter defining a number of slots between a slot scheduled for reception on the PDCCH and a slot scheduled for transmission on the PUSCH;
a fifth parameter defining minimum and/or maximum bandwidth values and/or constraints in BWPs; and/or
a sixth parameter defining a set of supported number of multiple-input-multiple-output (MIMO) layers.

In some embodiments, the one or more scheduling-power profiles may include (comprise) a first profile constraining the base station to schedule transmission of an acknowledgment of data received on the PDCCH to a first slot immediately preceding a second slot scheduled for PDCCH monitoring. In some embodiments, the first profile may be indicated via a PS_ACK_Schedule RRC parameter.

In some embodiments, the one or more scheduling-power profiles may include (comprise) a second profile constraining the base station to schedule transmission on the PUSCH to a third slot immediately preceding a fourth slot scheduled for PDCCH monitoring. In some embodiments, the second profile may be indicated via a PS_PUSCH_Schedule RRC parameter.

In some embodiments, the one or more scheduling-power profiles may include (comprise) a third profile constraining the base station to cross-slot schedule transmission of an ACK of a PDCCH and a reception on the physical downlink shared channel (PDSCH) to a fifth slot immediately preceding a sixth slot scheduled for PDCCH monitoring. In some embodiments, the third profile is indicated via a PS_K1_equal_0 RRC parameter.

In some embodiments, a method may include a base station, such as gNB 604 and/or base station 102:
  exchanging communications with a user equipment device (UE) to determine one or more scheduling profile, such as one or more scheduling-power profiles, wherein a scheduling-power profile specifies one or more parameters and/or constraints on UE communication behavior;
  transmitting, to the UE, a slot configuration schedule based on at least one scheduling-power profile of the one or more scheduling-power profiles; and
  performing communications with the UE based on the at least one scheduling-power profile.

In some embodiments, the communications with the UE to determine the one or more scheduling-power profiles may include (comprise) radio resource control (RRC) signal message exchanges.

In some embodiments, the one or more scheduling-power profiles may not conflict with one another.

In some embodiments, the one or more scheduling-power profiles may include (comprise) one or more of:
  a profile for delayed acknowledgement (ACK) with physical downlink control channel (PDCCH) monitoring;
  a profile for delayed physical uplink shared channel (PUSCH) scheduling with PDCCH monitoring;
  a profile for cross-slot scheduling with PDCCH monitoring;
  a profile for large bandwidth part (BWP) for large data packet scheduling;
  a profile for self-contained slot scheduling;
  a profile for power savings;
  a profile for high throughput;
  a profile for low latency;
  a profile for high system capacity;
  a profile for small data traffic; and/or
  a profile for PDCCH monitoring period.

In some embodiments, the one or more parameters and/or constraints may include (comprise) one or more of:
  a first parameter defining a set of values for search space monitoring periodicity;
  a second parameter defining a number of slots between a slot scheduled for reception on the PDCCH and a slot scheduled for reception on the physical downlink shared channel (PDSCH);
  a third parameter defining a number of slots between a slot scheduled for reception on the PDSCH and a slot scheduled for an acknowledgment;
  a fourth parameter defining a number of slots between a slot scheduled for reception on the PDCCH and a slot scheduled for transmission on the PUSCH;
  a fifth parameter defining minimum and/or maximum bandwidth values and/or constraints in BWPs; and/or
  a sixth parameter defining a set of supported number of multiple-input-multiple-output (MIMO) layers.

In some embodiments, the one or more scheduling-power profiles may include (comprise) a first profile constraining the base station to schedule transmission of an acknowledgment of data received on the PDCCH to a first slot immediately preceding a second slot scheduled for PDCCH monitoring.

In some embodiments, the first profile may be indicated via a PS_ACK_Schedule RRC parameter.

In some embodiments, the one or more scheduling-power profiles may include (comprise) a second profile constraining the base station to schedule transmission on the PUSCH to a third slot immediately preceding a fourth slot scheduled for PDCCH monitoring. In some embodiments, the second profile may be indicated via a PS_PUSCH_Schedule RRC parameter.

In some embodiments, the one or more scheduling-power profiles may include (comprise) a third profile constraining the base station to cross-slot schedule transmission of an ACK of a PDCCH and a reception on the physical downlink shared channel (PDSCH) to a fifth slot immediately preceding a sixth slot scheduled for PDCCH monitoring. In some embodiments, the third profile may be indicated via a PS_K1_equal_0 RRC parameter.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
at least one antenna;
at least one radio coupled to the antenna; and
at least one processor coupled to the at least one radio, wherein the at least one processor is configured to cause the base station to:
exchange communications with a user equipment device (UE) to determine a scheduling-power profile, wherein the communications include a UE proposal of a scheduling power profile sent to the base station and specifying a constraint on K0 and K2 values, wherein K0 defines a number of slots between a slot scheduled for a physical downlink control channel (PDCCH) and a slot scheduled for a physical downlink shared channel (PDSCH), and wherein K2 defines a number of slots between a slot scheduled for the PDCCH and a slot scheduled for a physical uplink shared channel (PUSCH);
transmit, to the UE, a slot configuration schedule based on the UE proposed scheduling-power profile; and
perform communications with the UE based on the UE proposed scheduling-power profile.

2. The base station of claim 1,
wherein the communications with the UE to determine the scheduling-power profile include radio resource control (RRC) signal message exchanges.

3. The base station of claim 1,
wherein the proposed scheduling-power profile includes one or more parameters, and wherein the one or more parameters include one or more of:
a first parameter defining a set of values for search space monitoring periodicity;
a second parameter defining a number of slots between a slot scheduled for reception on a physical downlink control channel (PDCCH) and a slot scheduled for reception on a physical downlink shared channel (PDSCH);
a third parameter defining a number of slots between a slot scheduled for reception on the PDSCH and a slot scheduled for an acknowledgment;
a fourth parameter defining a number of slots between a slot scheduled for reception on the PDCCH and a slot scheduled for transmission on a physical uplink shared channel (PUSCH);
a fifth parameter defining minimum and/or maximum bandwidth values and/or constraints in large bandwidth parts (BWPs); or
a sixth parameter defining a set of supported number of multiple-input-multiple-output (MIMO) layers.

4. The base station of claim 1,
wherein the scheduling-power profile does not conflict with one or more other scheduling-power profiles.

5. The base station of claim 4,
wherein the one or more other scheduling-power profiles include one or more of:
a profile for delayed acknowledgement (ACK) with physical downlink control channel (PDCCH) monitoring;
a profile for delayed physical uplink shared channel (PUSCH) scheduling with PDCCH monitoring;
a profile for cross-slot scheduling with PDCCH monitoring;
a profile for large bandwidth part (BWP) for large data packet scheduling;
a profile for self-contained slot scheduling;
a profile for power savings;
a profile for high throughput;
a profile for low latency;
a profile for high system capacity;
a profile for small data traffic; or
a profile for PDCCH monitoring period.

6. The base station of claim 4,
wherein the one or more other scheduling-power profiles comprise a profile constraining the base station to schedule transmission of an acknowledgment of data received on a physical downlink control channel (PDCCH) to a first slot immediately preceding a second slot scheduled for PDCCH monitoring,
and wherein the profile is indicated via a radio resource control parameter.

7. The base station of claim 4,
wherein the one or more other scheduling-power profiles include a profile constraining the base station to schedule transmission on a physical uplink shared channel (PUSCH) to a third slot immediately preceding a fourth slot scheduled for a physical downlink control channel (PDCCH) monitoring, and wherein the profile is indicated via a radio resource control (RRC) parameter.

8. The base station of claim 4,
wherein the one or more other scheduling-power profiles include a profile constraining the base station to cross-slot schedule transmission of an acknowledgement of a physical downlink control channel and a reception on the physical downlink shared channel to a fifth slot immediately preceding a sixth slot scheduled for physical downlink control channel monitoring, and wherein the profile is indicated via a radio resource control (RRC) parameter.

9. An apparatus, comprising:
a memory; and
at least one processor in communication with the memory;
wherein the at least one processor is configured to:
exchange radio resource control (RRC) messages with a user equipment device (UE) to determine one or more scheduling profiles, wherein the RRC messages include a proposal of a scheduling-power profile, wherein the RRC messages include a proposal of a scheduling power profile sent to the apparatus and specifying a constraint on K0 and K2 values, wherein K0 defines a number of slots between a slot scheduled for a physical downlink control channel (PDCCH) and a slot scheduled for a physical downlink shared channel (PDSCH), and wherein K2 defines a number of slots between a slot scheduled for the PDCCH and a slot scheduled for a physical uplink shared channel (PUSCH);
generate instructions to transmit, to the UE, a slot configuration schedule based on the proposed scheduling profile; and
perform, based on the proposed scheduling profile, communications with the UE.

10. The apparatus of claim 9,
wherein the proposed scheduling-power profile includes one or more parameters, and wherein the one or more parameters include one or more of:
a first parameter defining a set of values for search space monitoring periodicity;
a second parameter defining a number of slots between a slot scheduled for reception on a physical downlink control channel (PDCCH) and a slot scheduled for reception on a physical downlink shared channel (PDSCH);

a third parameter defining a number of slots between a slot scheduled for reception on the PDSCH and a slot scheduled for an acknowledgment;

a fourth parameter defining a number of slots between a slot scheduled for reception on PDCCH and a slot scheduled for transmission on a physical uplink shared channel (PUSCH);

a fifth parameter defining minimum and/or maximum bandwidth values and/or constraints in large bandwidth parts (BWPs); or a sixth parameter defining a set of supported number of multiple-input-multiple-output (MIMO) layers.

11. The apparatus of claim 9, wherein the scheduling-power profile does not conflict with one or more other scheduling-power profiles.

12. The apparatus of claim 11, wherein the one or more other scheduling profiles include three or more of:
   a profile for delayed acknowledgement (ACK) with physical downlink control channel (PDCCH) monitoring;
   a profile for delayed physical uplink shared channel (PUSCH) scheduling with PDCCH monitoring;
   a profile for cross-slot scheduling with PDCCH monitoring;
   a profile for large bandwidth part (BWP) for large data packet scheduling;
   a profile for self-contained slot scheduling;
   a profile for power savings;
   a profile for high throughput;
   a profile for low latency;
   a profile for high system capacity;
   a profile for small data traffic; or
   a profile for PDCCH monitoring period.

13. The apparatus of claim 11, wherein the one or more other scheduling profiles include:
   a first profile constraining the apparatus to schedule transmission of an acknowledgment of data received on a physical downlink control channel (PDCCH) to a first slot immediately preceding a second slot scheduled for PDCCH monitoring; and
   a second profile constraining the apparatus to schedule transmission on a physical uplink shared channel (PUSCH) to a third slot immediately preceding a fourth slot scheduled for the PDCCH monitoring.

14. The apparatus of claim 11, wherein the one or more other scheduling profiles include a first profile constraining the apparatus to cross-slot schedule transmission of an acknowledgement of a physical downlink control channel and a reception on the physical downlink shared channel to a fifth slot immediately preceding a sixth slot scheduled for physical downlink control channel monitoring, and wherein the first profile is indicated via an RRC parameter.

15. A method, comprising:
a base station,
   receiving, from a user equipment device (UE), a proposal of a scheduling-power profile, wherein the scheduling-power profile specifies a constraint on K0 and K2 values, herein K0 defines a number of slots between a slot scheduled for a physical downlink control channel (PDCCH) and a slot scheduled for a physical downlink shared channel (PDSCH), and wherein K2 defines a number of slots between a slot scheduled for the PDCCH and a slot scheduled for a physical uplink shared channel (PUSCH);
   transmitting, to the UE, a slot configuration schedule based on the proposed scheduling-power profile; and
   performing communications with the UE based on the proposed scheduling-power profile.

16. The method of claim 15, wherein the proposal of the scheduling-power profile is transmitted via a radio resource control (RRC) signal message.

17. The method of claim 15, wherein the proposed scheduling-power profile includes one or more parameters, and wherein the one or more parameters include one or more of:
   a first parameter defining a set of values for search space monitoring periodicity;
   a second parameter defining a number of slots between a slot scheduled for reception on a physical downlink control channel (PDCCH) and a slot scheduled for reception on a physical downlink shared channel (PDSCH);
   a third parameter defining a number of slots between a slot scheduled for reception on the PDSCH and a slot scheduled for an acknowledgment;
   a fourth parameter defining a number of slots between a slot scheduled for reception on a physical downlink control channel (PDCCH) and a slot scheduled for transmission on a physical uplink shared channel (PUSCH);
   a fifth parameter defining minimum and/or maximum bandwidth values and/or constraints in large bandwidth parts (BWPs); or
   a sixth parameter defining a set of supported number of multiple-input-multiple-output (MIMO) layers.

18. The method of claim 15, wherein the proposed scheduling-power profile does not conflict with one or more other scheduling-power profiles, and wherein the one or more other scheduling-power profiles include one or more of:
   a profile for delayed acknowledgement (ACK) with physical downlink control channel (PDCCH) monitoring;
   a profile for delayed physical uplink shared channel (PUSCH) scheduling with PDCCH monitoring;
   a profile for cross-slot scheduling with PDCCH monitoring;
   a profile for large bandwidth part (BWP) for large data packet scheduling;
   a profile for self-contained slot scheduling;
   a profile for power savings;
   a profile for high throughput;
   a profile for low latency;
   a profile for high system capacity;
   a profile for small data traffic; or
   a profile for PDCCH monitoring period.

19. The method of claim 18, wherein the one or more other scheduling-power profiles include at least one of:
   a first profile constraining the base station to schedule transmission of an acknowledgment of data received on a physical downlink control channel (PDCCH) to a first slot immediately preceding a second slot scheduled for PDCCH monitoring; and
   a second constraining the base station to schedule transmission on a physical uplink shared channel (PUSCH) to a third slot immediately preceding a fourth slot scheduled for the PDCCH monitoring.

20. The method of claim 18,
wherein the one or more other scheduling profiles include a first profile constraining the base station to cross-slot schedule transmission of an acknowledgement of a physical downlink control channel and a reception on the physical downlink shared channel to a fifth slot immediately preceding a sixth slot scheduled for physical downlink control channel monitoring, and wherein the first profile is indicated via a radio resource control parameter.

* * * * *